(12) United States Patent
Hepworth et al.

(10) Patent No.: US 7,070,091 B2
(45) Date of Patent: Jul. 4, 2006

(54) SYSTEMS AND METHODS FOR INTERFACING OBJECT IDENTIFIER READERS TO MULTIPLE TYPES OF APPLICATIONS

(75) Inventors: Paul Hepworth, Riverton, UT (US); George Powell, Sandy, UT (US)

(73) Assignee: The Code Corporation, Draper, UT (US)

( * ) Notice: Subject to any disclaimer, the term of this patent is extended or adjusted under 35 U.S.C. 154(b) by 181 days.

(21) Appl. No.: 10/773,574

(22) Filed: Feb. 6, 2004

(65) Prior Publication Data

US 2004/0163051 A1    Aug. 19, 2004

Related U.S. Application Data

(63) Continuation-in-part of application No. 10/623,747, filed on Jul. 21, 2003.

(60) Provisional application No. 60/399,215, filed on Jul. 29, 2002.

(51) Int. Cl.
*G06F 17/00* (2006.01)

(52) U.S. Cl. .................................... 235/375

(58) Field of Classification Search ............... 235/375; 705/50; 709/245; 340/5.1, 7.1
See application file for complete search history.

(56) References Cited

U.S. PATENT DOCUMENTS

| | | | |
|---|---|---|---|
| 3,513,320 | A | 5/1970 | Weldon |
| 4,488,679 | A | 12/1984 | Bockholt et al. |
| 4,654,718 | A | 3/1987 | Sueyoshi |
| 4,752,675 | A | 6/1988 | Zetmeir |
| 4,896,029 | A | 1/1990 | Chandler et al. |
| 4,958,064 | A | 9/1990 | Kirkpatrick |
| 4,998,010 | A | 3/1991 | Chandler et al. |
| 5,047,614 | A | 9/1991 | Bianco |
| 5,113,445 | A | 5/1992 | Wang |
| 5,153,418 | A | 10/1992 | Batterman et al. |
| 5,159,635 | A | 10/1992 | Wang |
| 5,189,292 | A | 2/1993 | Batterman et al. |
| 5,223,701 | A | 6/1993 | Batterman et al. |
| 5,343,028 | A | 8/1994 | Figarella et al. |
| 5,352,878 | A | 10/1994 | Smith et al. |
| 5,412,196 | A | 5/1995 | Surka |
| 5,428,211 | A | 6/1995 | Zheng et al. |

(Continued)

FOREIGN PATENT DOCUMENTS

EP    0837406 A2    4/1998

(Continued)

OTHER PUBLICATIONS

U.S. Appl. No. 10/420,527, Hepworth et al.

(Continued)

*Primary Examiner*—Thien M. Le
*Assistant Examiner*—Lisa M. Caputo
(74) *Attorney, Agent, or Firm*—Madson & Austin

(57) ABSTRACT

A computing device for processing object identifier data corresponding to an object identifier includes a processor and memory in electronic communication with the processor. Instructions are stored in the memory. The instructions are executable to implement a method that involves obtaining the object identifier data. The method also involves obtaining supplemental information about the object identifier. The supplemental information identifies a symbology of the object identifier. The method also involves matching the object identifier data with a first pattern associated with a first rule that comprises first instructions and also with a second rule that comprises second instructions. The method also involves using the symbology of the object identifier to determine which of the first rule and the second rule are applied to the object identifier data.

60 Claims, 14 Drawing Sheets

U.S. PATENT DOCUMENTS

| | | |
|---|---|---|
| 5,438,188 A | 8/1995 | Surka |
| 5,465,291 A | 11/1995 | Barrus et al. |
| 5,478,999 A | 12/1995 | Figarella et al. |
| 5,483,052 A | 1/1996 | Smith, III et al. |
| 5,493,105 A | 2/1996 | Desai |
| 5,545,887 A | 8/1996 | Smith et al. |
| 5,604,640 A | 2/1997 | Zipf et al. |
| 5,612,527 A | 3/1997 | Ovadia |
| 5,804,803 A | 9/1998 | Cragun et al. |
| 5,869,819 A | 2/1999 | Knowles et al. |
| 5,903,729 A | 5/1999 | Reber et al. |
| 5,905,248 A | 5/1999 | Russell et al. |
| 5,905,251 A | 5/1999 | Knowles |
| 5,933,634 A | 8/1999 | Enokido et al. |
| 5,933,829 A | 8/1999 | Durst et al. |
| 5,938,726 A | 8/1999 | Reber et al. |
| 5,978,773 A | 11/1999 | Hudetz et al. |
| 5,992,752 A | 11/1999 | Wilz, Sr. et al. |
| 6,012,102 A | 1/2000 | Shachar |
| 6,027,024 A | 2/2000 | Knowles |
| 6,032,195 A | 2/2000 | Reber et al. |
| 6,068,188 A | 5/2000 | Knowles |
| 6,076,733 A | 6/2000 | Wilz, Sr. et al. |
| 6,098,106 A | 8/2000 | Philyaw et al. |
| 6,108,656 A | 8/2000 | Durst et al. |
| 6,138,151 A | 10/2000 | Reber et al. |
| 6,154,738 A | 11/2000 | Call |
| 6,377,986 B1 | 4/2002 | Philyaw et al. |
| 6,384,744 B1 | 5/2002 | Philyaw et al. |
| 6,398,105 B1 * | 6/2002 | Ramberg et al. ............ 235/375 |
| 6,535,883 B1 | 3/2003 | Lee et al. |
| 6,564,249 B1 | 5/2003 | Shiigi |
| 6,584,601 B1 | 6/2003 | Kodosky et al. |
| 2002/0144017 A1 | 10/2002 | Hepworth et al. |
| 2002/0147743 A1 | 10/2002 | Le et al. |
| 2002/0149793 A1 | 10/2002 | Hepworth et al. |
| 2002/0152241 A1 | 10/2002 | Hepworth et al. |
| 2003/0163396 A1 | 8/2003 | Blankevoort et al. |
| 2003/0163800 A1 | 8/2003 | Zhou et al. |

FOREIGN PATENT DOCUMENTS

| | | |
|---|---|---|
| WO | WO98/03923 | 1/1998 |
| WO | WO98/06055 | 2/1998 |
| WO | WO98/24036 | 6/1998 |
| WO | WO98/40823 | 9/1998 |
| WO | WO98/49813 | 11/1998 |
| WO | WO99/04326 | 1/1999 |

OTHER PUBLICATIONS

"Punched Cards to Bar Codes," Benjamin Nelson, Helmers Publishing, Inc. 1997, pp. 1-16.

"MiniCode," http://www.omniplanar.com/minicode.html, pp. 1-10, May 17, 1999.

* cited by examiner

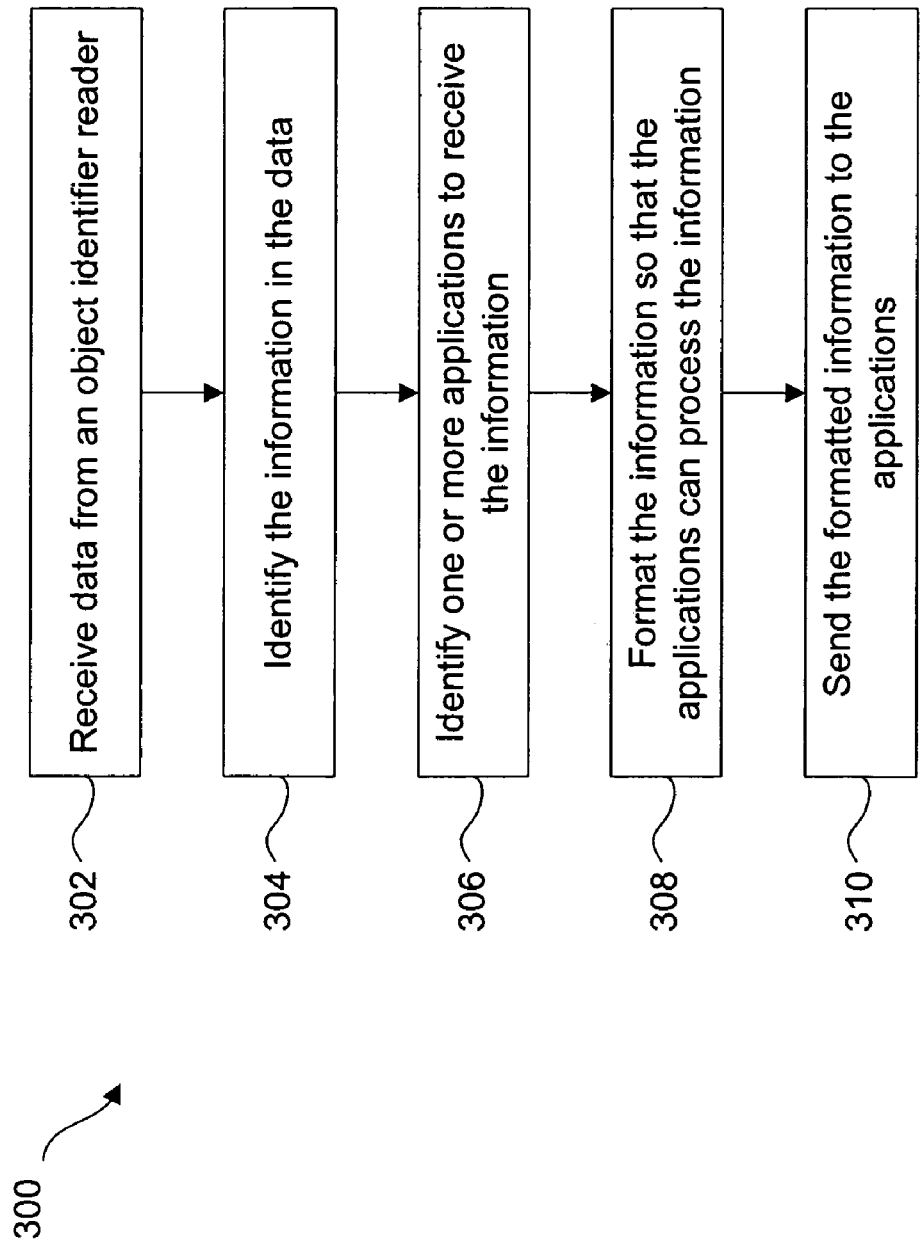

FORMATTING INSTRUCTIONS 828

| Field Identifier (primary key) | Tag | Tag Terminator | Tag-Content Separator String | Content Format String | Default Content | Field Terminator | Field Separator | Pad (none, left, right, both) | Pad character |
|---|---|---|---|---|---|---|---|---|---|
| codeXML date | ^1787^date | / | <none> | nnnn/nn/nn | <none> | <none> | <none> | none | <none> |
| codeXML first name | ^1787^fname | / | <none> | a* | <none> | <none> | <none> | none | <none> |
| codeXML middle initial | ^1787^minit | / | <none> | a* | <none> | <none> | <none> | none | <none> |
| codeXML last name | ^1787^lname | / | <none> | a* | <none> | <none> | <none> | none | <none> |
| codeXML SSN | ^1787^ssn | / | <none> | nnn-nn-nnnn | <none> | <none> | <none> | none | <none> |
| Spec2000 MFR | MFR | <none> | <space> | a* | <none> | <none> | / | none | <none> |
| Spec2000 PNR | PNR | <none> | <space> | n* | <none> | <none> | / | none | <none> |

FIG. 8

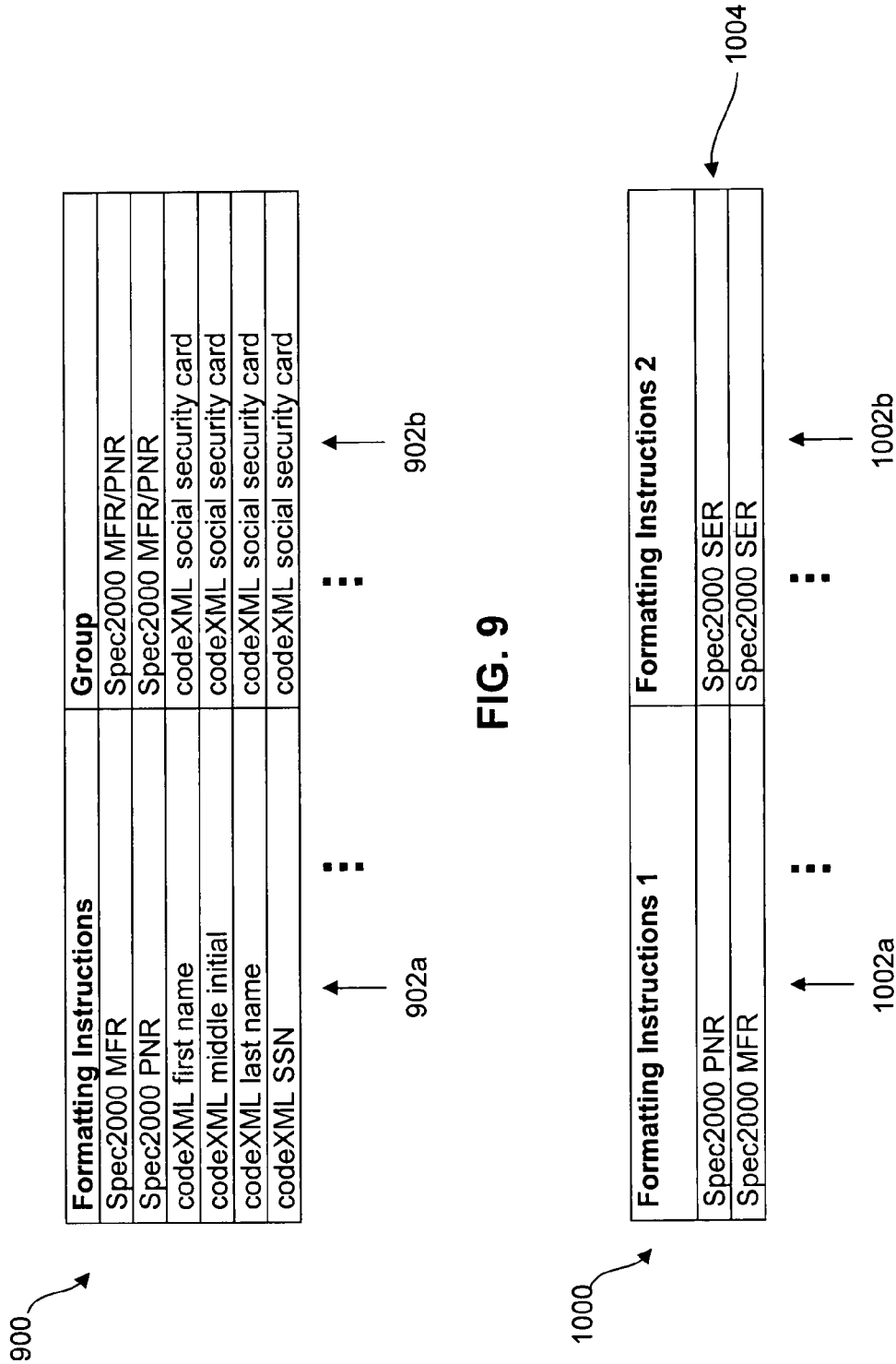

SYSTEMS AND METHODS FOR INTERFACING OBJECT IDENTIFIER READERS TO MULTIPLE TYPES OF APPLICATIONS

RELATED APPLICATIONS

This application is a continuation-in-part of U.S. patent application Ser. No. 10/623,747, filed Jul. 21, 2003, for "Systems and Methods for Interfacing Multiple Types of Object Identifiers and Object Identifier Readers to Multiple Types of Applications," with inventors Paul J. Hepworth, George Powell, and Weiyang Zhou, application Ser. No. 10/623,747 claims priority from U.S. Provisional Patent Application Ser. No. 60/399,215, filed Jul. 29, 2002, for "System and Method of Interfacing Multiple Types of Object Identifiers and Object Identifier Readers to Multiple Types of Applications," with inventors Paul Hepworth, George Powell, and Weiyang Zhou. The contents of application Ser. No. 10/623,747 and Application No. 60/399,215 are hereby incorporated by reference in their entirety.

This application is related to U.S. patent application Ser. No. 10/006,439, filed Nov. 20, 2001, for "Extensible Application Interface Using Machine-Readable Graphical Codes," with inventors Paul J. Hepworth, Dimitri V. Yatsenko, and Darren P. Smith.

TECHNICAL FIELD

The present invention relates generally to the field of machine-readable object identifiers. More specifically, the present invention relates to systems and methods for interfacing multiple types of object identifiers and object identifier readers to multiple types of applications.

BACKGROUND

Computer technology has entered many areas to simplify manual tasks and to make information more readily available. Most people use several computer programs every day that greatly simplify their work day. In addition, through the use of a computer, vast amounts of information are readily available. Computer software and electronic information sources are typically found on storage media or storage devices such as hard drives, CD-ROMs, DVD-ROMs, etc., on a local computer, on a local computer network or a global computer network, such as the Internet.

Software applications can be used for many purposes including assisting a person in performing his or her job. For example, word processors help computer users prepare documents, spreadsheet programs help users perform accounting functions and numerical analysis, diagnostic programs assist users in diagnosing problems, etc. There are many applications available to help users with almost any need they may have. Typically, software applications operate upon data in order to help a user. Thus, the data is somehow input into the application.

One way to input data into a software application involves the use of machine-readable object identifiers, such as bar codes, matrix codes, radio-frequency identification (RFID) tags, magnetic stripes, smart cards, punch cards, etc. An object identifier may be a graphical or electromagnetic representation of data. A user may scan the object identifier with an object identifier reader which converts the object identifier into object identifier data. Typically, the object identifier reader is in electronic communication with a software application running on a computing device through a communication interface. Typically, a communication interface includes a communication port (e.g., serial port, keyboard port, etc.) and a software driver associated with the communication port. After the object identifier reader converts the graphical code into object identifier data, it typically sends the object identifier data to the application through the communication interface associated with the application. The application may then use the object identifier data to accomplish one or more tasks.

Typically, object identifier data includes both information and formatting characters. The formatting characters generally allow applications that receive the object identifier data to process the information contained within the object identifier data. For example, suppose that information (e.g., a part serial number, such as "ABC000198") is encoded into a machine-readable object identifier. Formatting characters (e.g., a descriptive tag, such as "SER") may also be encoded into the object identifier. Thus, when the object identifier is read by an object identifier reader, the object identifier data received by an application may be "SER ABC000198". In this example, the descriptive tag "SER" allows an application that receives the object identifier data to correctly interpret "ABC000198" as a part serial number.

Typically, the types of formatting characters included within the object identifier data and the arrangement of those formatting characters within the object identifier data are determined by a particular object identifier format. Examples of different object identifier formats include SPEC2000, ANSI MH10.8.3, codeXML, UPC, etc., as well as various proprietary formats. In the above example, the object identifier data was "SER ABC000198". However, if the same part serial number were encoded according to another object identifier format, the object identifier data may be, for example, "<part>ABC000198</part>." In both examples, the information is the same (i.e., "ABC000198"). However, the formatting characters in the two examples are different because the object identifiers were encoded according to different object identifier formats.

Presently, there are several problems associated with interfacing object identifiers, object identifier readers, and software applications. For example, an application is generally configured to recognize and interpret the formatting characters associated with a particular object identifier format. If an application receives object identifier data that includes formatting characters associated with a different object identifier format, the application may not be able to process the object identifier data.

In addition, applications are typically configured to receive object identifier data through a particular communication interface, and, as a result, it is not possible for these applications to receive object identifier data through a different communication interface. For example, a serial port object identifier reader may not be usable with an application that was written for a keyboard wedge object identifier reader.

In addition, it would be beneficial to be able to add information to an object identifier beyond what was originally expected by the application without breaking its use with the original application. Without this ability it is not practical to "phase in" new information while retaining compatibility with applications that have not been upgraded to process the new information.

Finally, it would be beneficial for the single reading of a single object identifier to cause more than one application to take action. For example, this would enable an inventory tracking application and a separate POS application, both of which are capable of receiving object identifier data from a communication interface, to both receive the product number read a single time from an object identifier by a single reader attached to a single communication interface.

Accordingly, benefits may be realized if means were provided to address one or more of the above problems.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

FIG. 3 is a flow diagram of an embodiment of a method for interfacing multiple types of object identifiers and object identifier readers to multiple types of applications;

FIG. 8 is a table illustrating an embodiment of the formatting instructions;

FIG. 9 is a table which may be used to organize the formatting instructions into groups;

FIG. 10 is another table which may be used to organize the formatting instructions;

DETAILED DESCRIPTION

Figure 1:
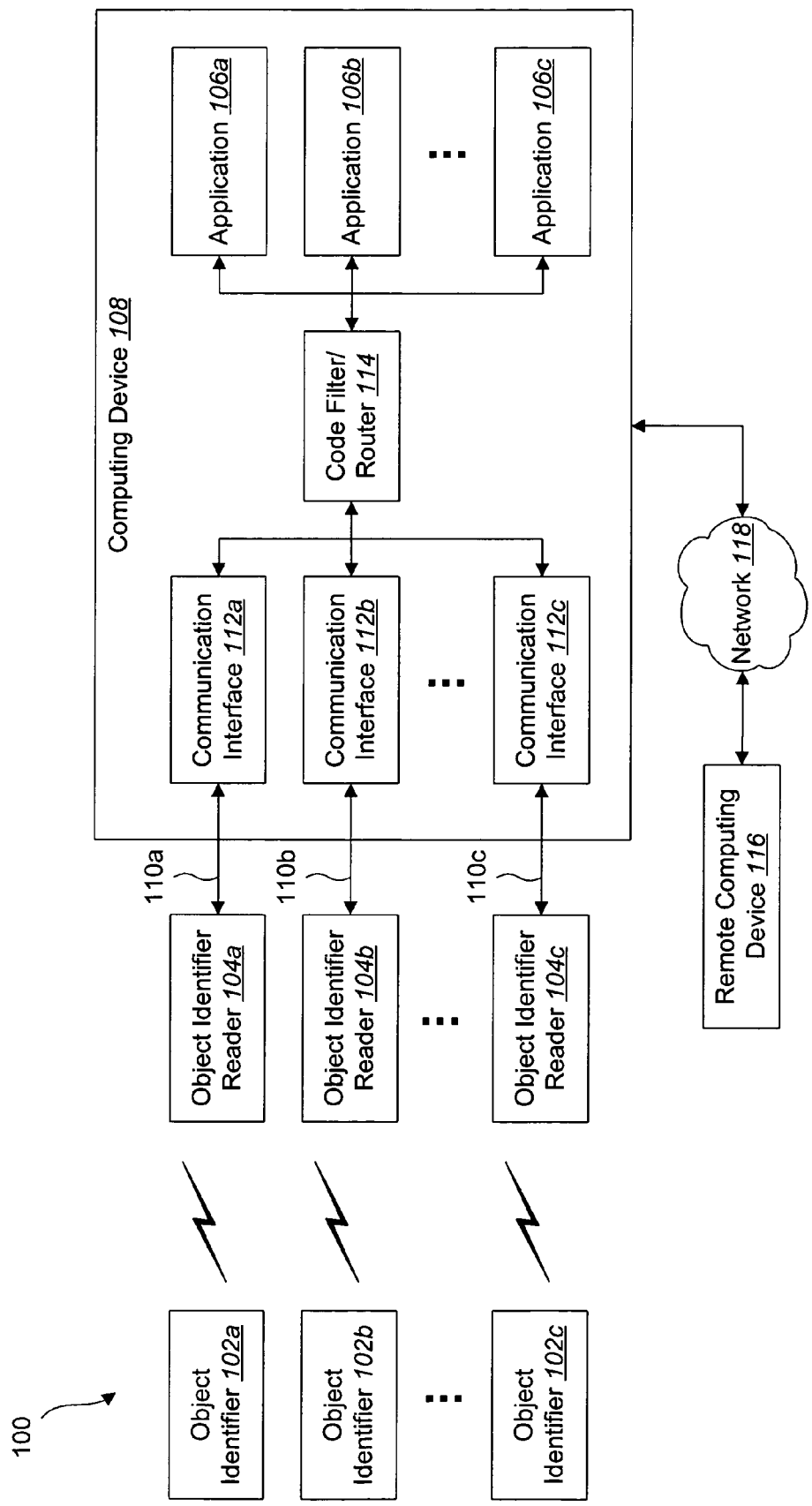
FIG. 1 is a block diagram of an embodiment of a system for interfacing multiple types of object identifiers and object identifier readers to multiple types of applications.

A computing device for processing object identifier data corresponding to an object identifier is disclosed. The computing device includes a processor and memory in electronic communication with the processor. Instructions are stored in the memory. The instructions are executable to implement a method that involves obtaining the object identifier data. The method also involves obtaining supplemental information about the object identifier. The supplemental information identifies a symbology of the object identifier. The method also involves matching the object identifier data with a first pattern associated with a first rule that comprises first instructions and also with a second rule that comprises second instructions. The method also involves using the symbology of the object identifier to determine which of the first rule and the second rule are applied to the object identifier data.

In some embodiments, the computing device includes an object identifier reader. The object identifier reader is a set of hardware and software components integrated into the computing device. In such embodiments, obtaining the object identifier data may involve reading the object identifier.

Alternatively, the object identifier reader may be a separate device connected to the computing device via a communication interface. In such embodiments, obtaining the object identifier data may involve receiving the object identifier data from an object identifier reader. Obtaining the supplemental information may involve receiving the supplemental information from the object identifier reader. Alternatively, obtaining the object identifier data may involve determining the communication interface through which the object identifier data is received, and determining the supplemental information associated with the communication interface.

Another embodiment of a computing device for processing object identifier data corresponding to an object identifier is also disclosed. The computing device includes a processor and memory in electronic communication with the processor. Instructions are stored in the memory. The instructions are executable to implement a method that involves obtaining the object identifier data. The method also involves identifying information in the object identifier data. A first application and a second application are identified to receive the information. The information is sent to the first application in a first format and to the second application in a second format. The first format may be different from the second format. Alternatively, the first format may be the same as the second format.

Another embodiment of a computing device for processing object identifier data corresponding to an object identifier is also disclosed. The computing device includes a processor and memory in electronic communication with the processor. Instructions are stored in the memory. The instructions are executable to implement a method that involves obtaining the object identifier data. Information in the object identifier data is identified. An application is identified to receive the information. The information is sent to the application in a first format and in a second format that is different from the first format.

Another embodiment of a computing device for processing object identifier data corresponding to an object identifier is also disclosed. The computing device includes a processor and memory in electronic communication with the processor. Instructions are stored in the memory. The instructions are executable to implement a method that involves obtaining the object identifier data. Object identifier information is identified in the object identifier data. A first element is formed that includes first element information and a first characteristic. The first element information includes a first portion of the object identifier information. A second element is formed that includes second element information and a second characteristic. The second element information includes the first portion of the object identifier information. In some embodiments, the first element information also includes a second portion of the object identifier information.

Another embodiment of a computing device for processing object identifier data corresponding to an object identifier is also disclosed. The computing device includes a processor and memory in electronic communication with the processor. Instructions are stored in the memory. The instructions are executable to implement a method that involves obtaining the object identifier data. The method also involves determining whether a command has been received to activate a first rule of a plurality of rules. If the command has been received, the method involves activating the first rule and applying the first rule to the object identifier data. In some embodiments, the plurality of rules include a parent rule and a child rule, and the child rule is only executed if the parent rule matches the object identifier data.

A computer-readable medium for storing program data is also disclosed. The program data includes executable instructions for implementing a method on a computing device. The method involves obtaining object identifier data corresponding to an object identifier. The method also involves obtaining supplemental information about the object identifier. The supplemental information identifies a symbology of the object identifier. The method also involves matching the object identifier data with a first pattern associated with a first rule that comprises first instructions and also with a second rule that comprises second instructions. The method also involves using the symbology of the object identifier to determine which of the first rule and the second rule are applied to the object identifier data.

Another embodiment of a computer-readable medium for storing program data is also disclosed. The program data includes executable instructions for implementing a method on a computing device. The method involves object identifier data corresponding to an object identifier. The method also involves identifying information in the object identifier data. A first application and a second application are identified to receive the information. The information is sent to the first application in a first format and to the second application in a second format. The first format may be different from the second format. Alternatively, the first format may be the same as the second format.

Another embodiment of a computer-readable medium for storing program data is also disclosed. The program data includes executable instructions for implementing a method on a computing device. The method involves obtaining object identifier data corresponding to an object identifier. Information in the object identifier data is identified. An application is identified to receive the information. The information is sent to the application in a first format and in a second format that is different from the first format.

Another embodiment of a computer-readable medium for storing program data is also disclosed. The program data includes executable instructions for implementing a method on a computing device. The method involves obtaining object identifier data corresponding to an object identifier. Object identifier information is identified in the object identifier data. A first element is formed that includes first element information and a first characteristic. The first element information includes a first portion of the object identifier information. A second element is formed that includes second element information and a second characteristic. The second element information includes the first portion of the object identifier information. In some embodiments, the first element information also includes a second portion of the object identifier information.

Another embodiment of a computer-readable medium for storing program data is also disclosed. The program data includes executable instructions for implementing a method on a computing device. The method involves obtaining object identifier data corresponding to an object identifier. The method also involves determining whether a command has been received to activate a first rule of a plurality of rules. If the command has been received, the method involves activating the first rule and applying the first rule to the object identifier data. In some embodiments, the plurality of rules include a parent rule and a child rule, and the child rule is only executed if the parent rule matches the object identifier data.

A method for processing object identifier data corresponding to an object identifier is also disclosed. The method involves obtaining the object identifier data. The method also involves obtaining supplemental information about the object identifier. The supplemental information identifies a symbology of the object identifier. The method also involves matching the object identifier data with a first pattern associated with a first rule that comprises first instructions and also with a second rule that comprises second instructions. The method also involves using the symbology of the object identifier to determine which of the first rule and the second rule are applied to the object identifier data.

Another embodiment of a method for processing object identifier data corresponding to an object identifier is also disclosed. The method involves obtaining the object identifier data. The method also involves identifying information in the object identifier data. A first application and a second application are identified to receive the information. The information is sent to the first application in a first format and to the second application in a second format. The first format may be different from the second format. Alternatively, the first format may be the same as the second format.

Another embodiment of a method for processing object identifier data corresponding to an object identifier is also disclosed. The method involves obtaining the object identifier data. Information in the object identifier data is identified. An application is identified to receive the information. The information is sent to the application in a first format and in a second format that is different from the first format.

Another embodiment of a method for processing object identifier data corresponding to an object identifier is also disclosed. The method involves obtaining the object identifier data. Object identifier information is identified in the object identifier data. A first element is formed that includes first element information and a first characteristic. The first element information includes a first portion of the object identifier information. A second element is formed that includes second element information and a second characteristic. The second element information includes the first portion of the object identifier information. In some embodiments, the first element information also includes a second portion of the object identifier information.

Another embodiment of a method for processing object identifier data corresponding to an object identifier is also disclosed. The method involves obtaining the object identifier data. The method also involves determining whether a command has been received to activate a first rule of a plurality of rules. If the command has been received, the method involves activating the first rule and applying the first rule to the object identifier data. In some embodiments, the plurality of rules include a parent rule and a child rule, and the child rule is only executed if the parent rule matches the object identifier data.

It will be readily understood that the components of the embodiments as generally described and illustrated in the Figures herein could be arranged and designed in a wide variety of different configurations. Thus, the following more detailed description of the embodiments of the systems and methods of the present invention, as represented in the Figures, is not intended to limit the scope of the invention, as claimed, but is merely representative of the embodiments of the invention.

Several aspects of the embodiments described herein will be illustrated as software modules stored in a computing device. As used herein, a software module may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

FIG. 1 is a block diagram of an embodiment of a system 100 for interfacing multiple types of object identifiers 102 and object identifier readers 104 to multiple types of applications 106. The system 100 may include a computing device 108. A computing device 108, as used herein, is any device that includes a digital processor capable of receiving and processing data. A computing device 108 includes the broad range of digital computers, including hand-held computers, personal computers, servers, mainframes, supercomputers, microcontrollers, and the like.

The system 100 may also include one or more object identifiers 102. As used herein, an object identifier 102 refers to any type of machine-readable identifier, including a bar code, a data matrix code, an RFID tag, a magnetic stripe, a smart card, a punch card, and the like.

The system 100 may also include one or more object identifier readers 104. As used herein, an object identifier reader 104 is a device or a set of hardware and software components that is configured to read an object identifier 102 and to generate object identifier data 110 representing the object identifier 102. The object identifier data 110 generated by the object identifier reader 104 may be sent to and processed by the computing device 108. Object identifier readers 104 are commercially available and known to those skilled in the art. Examples of object identifier readers 104 include bar code scanners, matrix code scanners, RFID readers, magnetic stripe readers, etc. In FIG. 1, the object identifier readers 104 are shown as separate units connected to the computing device 108 by communication interfaces 112. In alternative embodiments, the object identifier readers 104 may comprise hardware and software components that are incorporated directly into the computing device 108. Alternatively still, there may be a combination of separate object identifier reader units connected to the computing device 108 by communication interfaces 112 and object identifier reader components incorporated directly into the computing device 108. Exemplary embodiments where the object identifier readers 104 are incorporated directly into the computing device 108 are also described in a concurrently filed U.S. patent application entitled "Data Collection Device With Integrated Data Translation," with inventors Paul Hepworth and George Powell, assigned to the assignee of the present invention, and hereby incorporated by reference in its entirety.

Each object identifier reader 104 in the system 100 may be in communication with the computing device 108 through a communication interface 112. A communication interface 112 may consist of hardware, software, or a combination of hardware and software. In one embodiment, each communication interface 112 may include a communication port (e.g., serial port, keyboard port, etc.) and a filter driver associated with the communication port. A filter driver is a facility for receiving data from a communication port, modifying it or otherwise filtering it, and then sending the data to its appropriate destination. The filter driver may be part of an operating system (not shown) that is running on the computing device 108. Windows 98 and later and Windows NT and later derivative operating systems support filter drivers for communication ports. These filter drivers are programmed according to the Microsoft DDK and are well known to those skilled in the art. Other operating systems support similar means for filtering data as part of or in conjunction with the device drivers for the communication ports.

The computing device 108 may also include a code filter/router (hereinafter, "CFR") 114. The CFR 114 may be a software module, as that term is described above. The functions performed by the CFR 114 will be explained below.

The system 100 also includes one or more applications 106. As used herein, an application 106 refers to a software module that processes data for a user of the computing device 108. The one or more applications 106 in the system 100 are in electronic communication with the CFR 114. In the illustrated embodiment, the one or more applications 106 are located on the same computing device 108 as the CFR 114. Alternatively, however, the CFR 114 and the one or more applications 106 may be located on different computing devices 108. In such embodiments, communication between the CFR 114 and the one or more applications 106 may occur via a communication interface 112 such as TCP/IP over a wired or a wireless network, RS-232, USB, bluetooth, etc.

The CFR 114 may be configured to perform a variety of functions. For example, the CFR 114 may allow an application 106 that is configured to interpret object identifier data 110 in a particular object identifier format to receive and correctly process object identifier data 110 read from an object identifier 102 that was encoded according to a different object identifier format. The CFR 114 may also allow more than one application 106 to receive and process object identifier data 110 read a single time from a single object identifier 102. The CFR 114 may also allow information to be added to an object identifier 102 beyond what was originally expected by the application 106 without breaking its use with the original application 106.

In the illustrated embodiment, where the CFR 114 and the one or more applications 106 are located on the same computing device 108, each application 106 may be configured to receive object identifier data 110 from one or more of the object identifier readers 104 through a communication interface 112. The CFR 114 may allow an application 106 that is configured to receive object identifier data 110 through a specific communication interface 112 to receive object identifier data 110 from an object identifier reader 104 that is in electronic communication with a different communication interface 112. Various embodiments of the CFR 114 will be described below.

The system 100 may also include a remote computing device 116 in communication with the computing device 108 over a network 118. As used herein, a network 118 refers to any system that facilitates the transmission of data between the computing device 108 and the remote computing device 116. Networks 118 are known to those skilled in the art. Examples of networks 118 include a local area network, a wide area network, a wireless network, the Internet, and the like.

Figure 2:
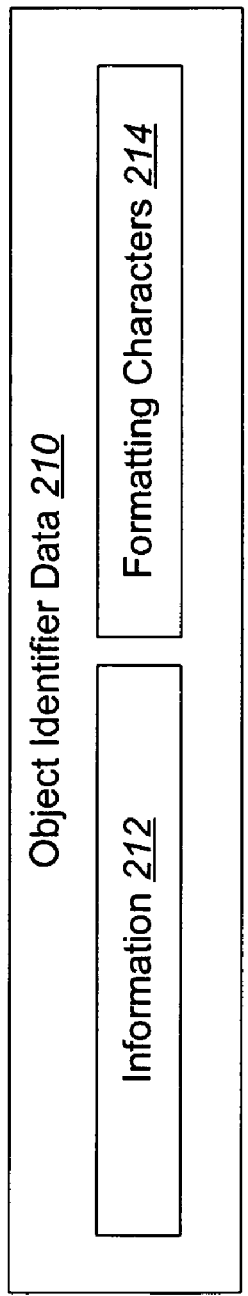
FIG. 2 is a block diagram illustrating an embodiment of the object identifier data.

FIG. 2 is a block diagram illustrating an embodiment of the object identifier data 210. As stated previously, the object identifier data 210 may be generated by an object identifier reader 104 that reads an object identifier 102. The object identifier data 210 may be sent to and processed by the CFR 114.

As shown, the object identifier data 210 may include information 212 and formatting characters 214. The formatting characters 214 generally allow applications 106 that receive the object identifier data 210 to process the information 212 contained within the object identifier data 210. Although only one piece of information 212 is shown in FIG. 2, those skilled in the art will understand that the object identifier data 210 may include multiple pieces of information 212. Various formatting characters 214 may be associated with each piece of information 212. In addition, FIG. 2 is not meant to imply anything about how the information 212 and the formatting characters 214 are positioned relative to one another. The formatting characters 214 may be positioned before, positioned after, and/or interspersed among the information 212.

Typically, the types of formatting characters 214 included within the object identifier data 210 and the arrangement of those formatting characters 214 within the object identifier data 210 are determined by a particular object identifier format. For example, suppose that the part number "12345" is encoded into an object identifier 102 which is then read by an object identifier reader 104 to generate object identifier data 210. If the object identifier 102 is encoded according to a particular object identifier format, the object identifier data 210 may be "PNR 12345". However, if the object identifier 102 is encoded according to another object identifier format, the object identifier data 210 may be "<part>12345</part>." In both examples, the information 212 is the same (i.e., "12345"). However, the formatting characters 214 in the two examples are different because the object identifiers 102 were encoded according to different object identifier formats.

Generally, an application 106 is compatible with one or more object identifier formats. That is, an application 106 may be configured to recognize and interpret the formatting characters 214 associated with one or more object identifier formats. However, an application 106 may not be compatible with some object identifier formats. That is, an application 106 may not be configured to recognize and interpret the formatting characters 214 associated with some object identifier formats. If an application 106 receives information 212 that is formatted according to an object identifier format that the application 106 is not compatible with, the application 106 may not be able to correctly process the information 212.

Figure 2A:
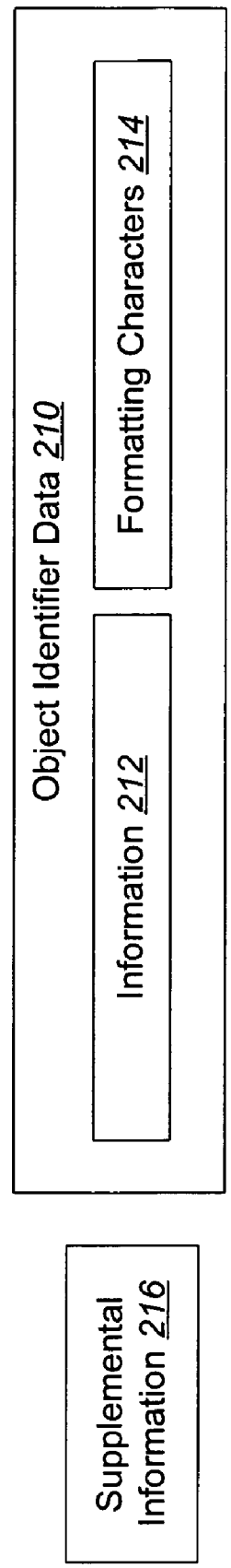
FIG. 2A is a block diagram illustrating an embodiment of the object identifier data and supplemental information.

As shown in FIG. 2A, in some embodiments supplemental information 216 about the object identifier 102 may be sent to the computing device 108. The supplemental information 216 may be in addition to the object identifier data 210 itself. For example, the supplemental information 216 may include the type of object identifier 102 (bar code, RFID, etc.), the symbology type and version, etc.

In some embodiments, the supplemental information 216 may be generated by and sent to the computing device 108 by the object identifier reader 104. The supplemental information 216 may be inserted before the object identifier data 110. In some embodiments, the object identifier reader 104 may pass the supplemental information 216 as a prefix to the object identifier data 110 read from the object identifier 102. For example, a barcode reader might prefix data read from a UPC code with the AIM identifier for UPC. Alternatively, the supplemental information 216 may be inserted after and/or among the object identifier data 210. Alternatively still, the supplemental information 216 may be inferred by the communication interface 112. For example, the system 100 may be configured with a first type of object identifier reader 104a in communication with a first communication interface 112a, and a second type of object identifier reader 104b in communication with a second communication interface 112b. A first type of supplemental information 216 may be added to object identifier data 110a received through the first communication interface 112a, and a second type of supplemental information 216 maybe added to object identifier data 110b received through the second communication interface 112b.

For example, suppose that the first type of object identifier reader 104a is a bar code reader 104a that is in communication with the computing device 108 through a keyboard port 112a, and that the second type of object identifier reader 104b is an RFID reader 104b that is in communication with the computing device 108 through a communication port 112b. The first type of supplemental information 216 may be added to object identifier data 110a that passes through the keyboard port 112a, and may identify the object identifier data 110a as coming from a bar code 102a. The second type of supplemental information 216 maybe added to object identifier data 110b that passes through the communication port 112b, and may identify the object identifier data 110b as coming from an RFID tag 102b.

FIG. 3 is a flow diagram of an embodiment of a method 300 for interfacing multiple types of object identifiers 102 and object identifier readers 104 to multiple types of applications 106. The CFR 114 may be configured to implement the method 300.

The method 300 may begin when object identifier data 110 is received 302 from an object identifier reader 104. The information 212 in the object identifier data 110 may then be identified 304. Various ways in which the information 212 may be identified 304 will be described below.

Once the information 212 in the object identifier data 110 is identified 304, one or more applications 106 may be identified 306 to receive the information 212. As mentioned previously, the applications 106 may be located on the same computing device 108 as the CFR 114. Alternatively, the CFR 114 and the one or more applications 106 may be located on different computing devices 108. In some embodiments, the step of identifying 306 applications to receive the information 212 may involve determining a characteristic of the information 212 (e.g., whether the information 212 represents a part number, a price, a phone number, etc.) and then identifying one or more applications 106 that are configured to process information 212 with that characteristic (e.g., applications 106 that are configured to process part numbers, prices, phone numbers, etc.). Various ways in which a characteristic of the information 212 may be determined will be described below. In addition, various other ways in which applications 106 may be identified 306 to receive the information 212 will be described below.

When one or more applications 106 have been identified 306, the information 212 may then be formatted 308 so that the applications 106 identified in step 306 can process the information 212. As will be described below, this may involve determining the format in which particular application 106 expects to receive object identifier data 210, and then adding formatting characters 214 to the information 212 that are consistent with that format. Once the information 212 is formatted 308 for a particular application 106, it 212 may then be sent 310 to that application 106.

In some embodiments, the information 212 from a single object identifier 102 may be routed to a single application 106 in two or more different formats. In such embodiments, the step of formatting 308 the information 212 may involve duplicating the information 212. The different copies of the information 212 may then be formatted according to different formats. Formatting characters 214 associated with a first format may be added to a first copy of the information 212, formatting characters associated with a second format may be added to a second copy of the information 212, and so on. After being formatted, the different copies of the information 212 may be sent to the same application 106.

Figure 4:
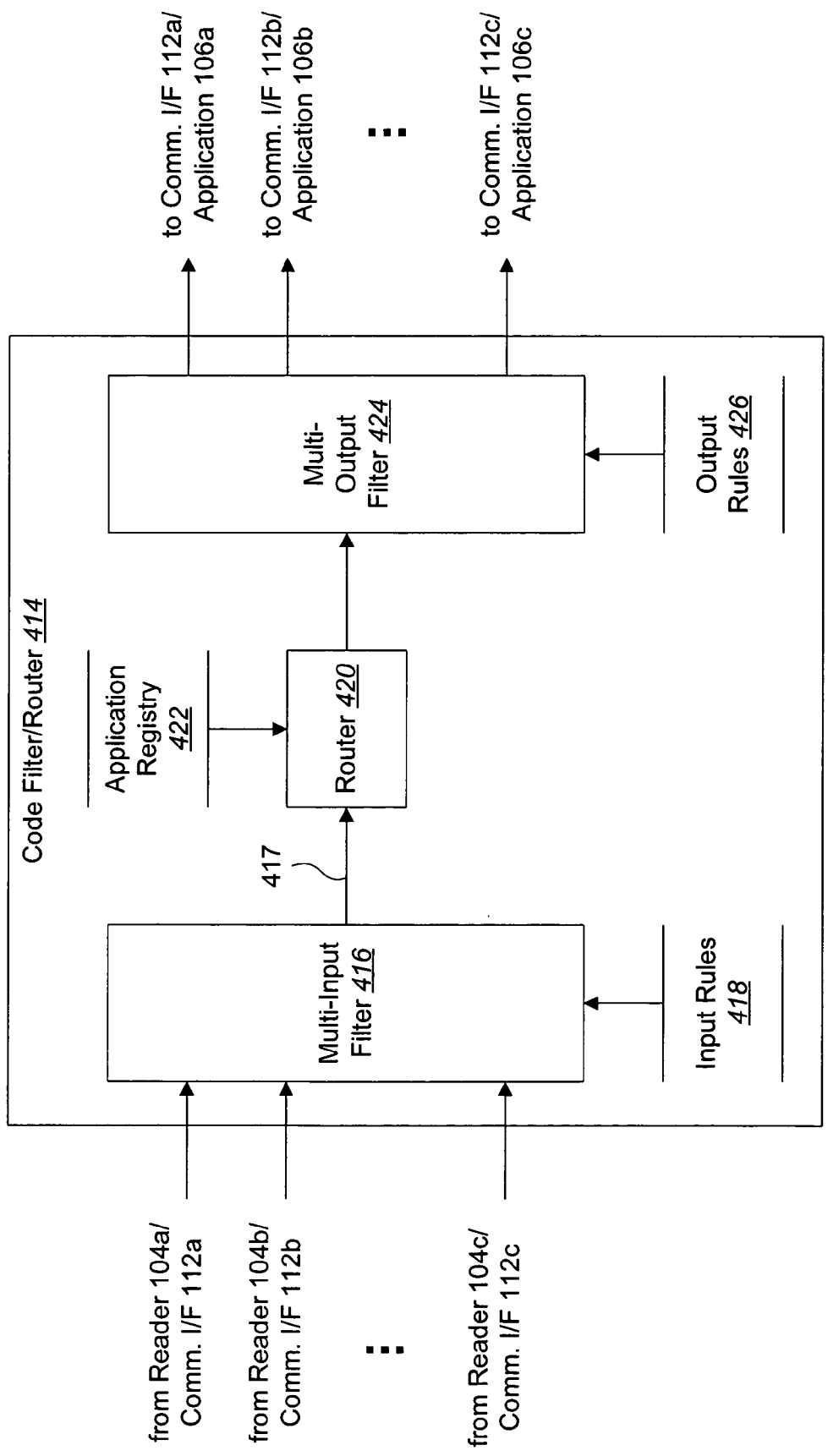
FIG. 4 is a block diagram illustrating an embodiment of a code filter/router.

FIG. 4 is a logical block diagram illustrating an embodiment of a CFR 414. The CFR 414 may include a multi-input filter 416, one or more input rules 418, a router 420, an application registry 422, a multi-output filter 424, and one or more output rules 426. Each of these components may be used to implement one or more of the functions of the CFR 414, as will be explained below.

As described above, the CFR 414 may be configured to receive 302 object identifier data 110 from an object identifier reader 104. In one embodiment, the object identifier data 110 may be received by the multi-input filter 416 through a communication interface 112.

Once the CFR 414 receives 302 object identifier data 110, the CFR 414 may be configured to identify 304 the information 212 contained in the object identifier data 110. In one embodiment, identifying 304 the information 212 in the object identifier data 110 may involve the multi-input filter 416 matching the object identifier data 110 with one of the input rules 418, and the multi-input filter 416 following the instructions in the input rule 418 that matches the object identifier data 110. An embodiment of the input rules 418 and an exemplary process by which the object identifier data 110 may be matched with one of the input rules 418 will be described below. Details about various instructions that may be contained in the input rules 418 will also be provided below.

In some embodiments, if the information 212 in the object identifier data 110 cannot be identified 304, the object identifier data 110 may be allowed to pass through the CFR 414 unmodified. For example, the multi-input filter 416 may be configured to send the object identifier data 110 back to the same communication interface 112 through which it 416 initially received the object identifier data 110. In an alternative embodiment, the multi-input filter 416 may be configured to simply discard object identifier data 110 if it 414 cannot identify the information 212 contained within the object identifier data 110. In another embodiment, the multi-input filter 416 may be configured to discard data 110 that it cannot identify and also to notify the user that the data was discarded. In an alternative embodiment, the multi-input filter 416 may be configured to let the user choose whether to pass through or discard object identifier data that the multi-input filter could not identify.

Once the information 212 in the object identifier data 110 is identified 304, the CFR 414 may be configured to identify 306 one or more applications 106 to receive the information 212. In one embodiment, this may involve the multi-input filter 416 determining a characteristic of the information 212 (e.g., whether the information 212 represents a part number, a price, a phone number, etc.). The information 212 and the characteristic associated with the information 212 may collectively be referred to herein as an element 417.

The multi-input filter 416 may then send the element 417, which includes the information 212 and the associated characteristic, to the router 420. The router 420 then identifies one or more applications 106 to which the information 212 in the element 417 should be sent. This may be accomplished by searching the application registry 422 to identify one or more applications 106 that are configured to process information 212 having the characteristic that is identified in the element 417.

Once an application 106 has been identified 306 to receive the information 212, the CFR 414 may be configured to format 308 the information 212 so that the application 106 can process the information 212. In some embodiments, the router 420 searches the application registry 422 to identify the object identifier format associated with the application 106 (i.e., the object identifier format in which the application 106 expects to receive the information 212). The router 420 then sends the element 417 received from the multi-input filter 416 (which includes the information 212 and the associated characteristic of the information 212) and the object identifier format associated with the application 106 to the multi-output filter 424. The multi-output filter 424 searches the output rules 426 to identify formatting instructions associated with the characteristic and the object identifier format. The multi-output filter 424 then formats the information 212 according to the formatting instructions.

Once the information 212 is formatted so that a particular application 106 can process the information 212, the CFR 414 may be configured to send 310 the formatted information 212 to the application 106. In some embodiments, the router 420 searches the application registry 422 to identify the communication interface 112 associated with the application 106 (i.e., the communication interface 112 through which the application 106 expects to receive the information 212). The router 420 sends the communication interface 112 associated with the application 106 to the multi-output filter 424. The multi-output filter 424 sends the formatted information 212 to the application 106 through the communication interface 112 received from the router 420.

In some embodiments, the multi-input filter 416 may use the same information 212, or the same portion of the information 212, to generate more than one element 417. In other words, the multi-input filter 416 may form a first element 417 that includes a first portion of the information 212 and an associated characteristic, a second element 417 that includes the first portion of the information 212 (and possibly another portion of the information 212) and a different characteristic, and so on. Each of these elements 417 may then be sent to the router 420, where they may be processed as described above.

As a specific example, suppose that an object identifier 102 contains the following information: "20021228/1234", where "20021228" is a date and "12345" is a product's IndexNumber. Further suppose that the full product code is derived from the date as well as the index number. In such a situation, the multi-input filter 416 may generate the following three elements 417: (Date, "2002-12-28"), (Index-Number, "1234"), and (ProductCode, "02121234"). A first portion of the information obtained from the object identifier, "0212", is used in two different elements 417: once in the Date element 417, and again in the ProductCode element 417. A second portion of the information, "1234", is also used in two different elements 417: once in the IndexNumber element 417, and again in the ProductCode element 417.

The following is a series of input transforms that the multi-input filter 416 may use to generate the elements 417 mentioned in the previous example:

```
match "[0–9]{8}/[0–9]{4}"
# input data is of the following format: YYyymmdd/nnnn
# desired output: YYyy-mm-dd, nnnn, and yymmnnnn
deleteFirst "/"          #data now YYyymmddnnnn
extractRange 2 4         #removes the portion desired of the date
                         #to be duplicated
insert 2 extracted       #puts a copy of the data back where it came from
insert 7 extracted       #data now YYyymmddyymmnnnn
extractRange 0 8         #remove the date portion into the extract buffer
                         #buffer data now yymmnnnn tag "Date"
accept extracted         #post the date element to the router
extractRange 4 4         #remove index portion to the extract buffer
tag "IndexNumber"
accept extracted         #post the index number element to the router
insert end extracted     #put a copy of the index number back
tag "ProductCode"\
accept buffer            #post the product code element to the router
```

Of course, the "extract and insert" pairs could be replaced with a new command for "copy". Other alternative implementations exist as well.

The input rules 418 and the output rules 426 are typically predefined and may be read from a file, database, or the like. In some embodiments, the input rules 418 and the output rules 426 may be downloaded over a network 116 such as a local area network or the Internet. Although not explicitly shown in FIG. 4, those skilled in the art will recognize that the input rules 418 and the output rules 426 may be changed in various ways. For example, an existing input rule 418 or output rule 426 may be modified. Alternatively or in addition, new input rules 418 and/or output rules 426 may be added.

Figure 5:
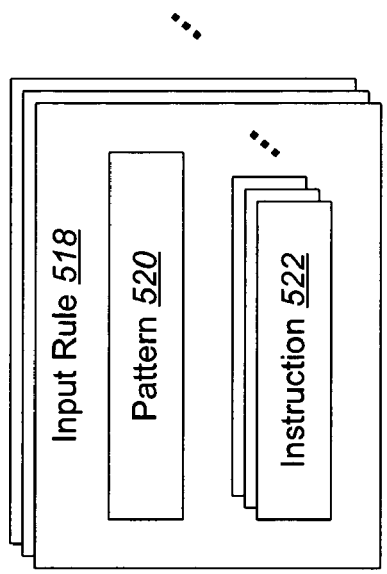
FIG. 5 is a block diagram of an embodiment of the input rules.

FIG. 5 is a block diagram of an embodiment of the input rules 518. As shown in FIG. 5, each input rule 518 may include a pattern 520. A pattern 520 may be any sequence of one or more characters. For example, a pattern 520 may be a sequence of alphanumeric characters (e.g., PNR, 123, etc.). Alternatively, a pattern 520 may be an expression that indicates a range of alphanumeric characters (e.g., [a–d], [3–7], etc.). Alternatively still, a pattern 520 may include one or more wildcard characters (e.g., PR*, 12*, etc.). Numerous other patterns 520 will be readily apparent to those skilled in the art in light of the teachings contained herein.

Each input rule 518 may also include one or more instructions 522 to perform specified operations on object identifier data 110. For example, an input rule 518 may include an instruction 522 to match the object identifier data 110 against a pattern 520, to extract a portion of the object identifier data 110 that matches a pattern 520, to extract a portion of the object identifier data 110 based on its position within the object identifier data 110, to insert a substring into a specified position in the object identifier data 110, to delete one or all occurrences of a specific character within the object identifier data 110, to delete a specific number of characters at specific positions within the object identifier data 110, to convert one or all occurrences of a character within the object identifier data 110 to another character, to translate a substring to another string, to associate a tag with the information 212 in the object identifier data 110, to send the tag and the information 212 (referred to hereinafter as a tag/information pair) to the router 420, to carry out the instructions 522 contained in another input rule 518, and so forth.

As stated previously, the input rules 518 may be used to identify 304 the information 212 in the object identifier data 110 received from an object identifier reader 104. In one embodiment, some or all of the instructions 522 in an input rule 518 may be designed to delete the formatting characters 214 from object identifier data 110 that matches the pattern 520 in the input rule 518. In such an embodiment, identifying the information 212 in the object identifier data 110 may involve matching the object identifier data 110 with the pattern 520 in an input rule 518, and then following one or more of the instructions 522 contained in the input rule 518. In some embodiments, both the object identifier data 110 and any supplemental information 216 associated with the object identifier data 110 may be matched with a pattern 520 in an input rule 518.

Figure 5A:
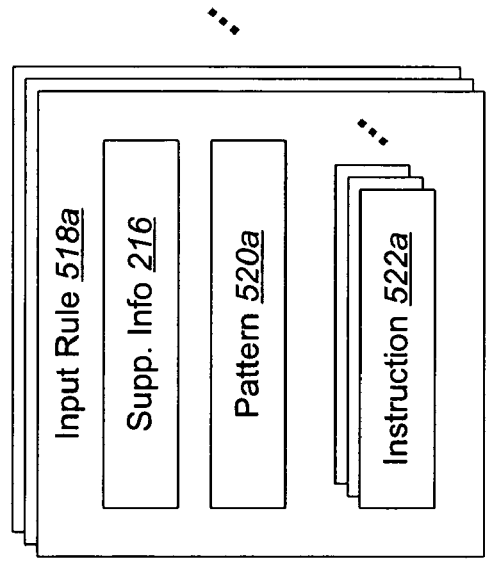
FIG. 5A is a block diagram of another embodiment of the input rules.

In other embodiments, as shown in FIG. 5A, each input rule 518a may also be associated with a type of supplemental information 216. As described previously, supplemental information 216 about an object identifier 102 may be received by the input filter 416.

If two types of object identifiers 102 contain the same object identifier data 110, the supplemental information 216 may be used to match the object identifier data 110 with the appropriate input rule 518a. For example, suppose that a UPC bar code 102a and an RFID tag 102b contain the same object identifier data 110. As described previously, a first type of supplemental information 216a may be added to object identifier data 110a generated from the UPC bar code 102a, and a second type of supplemental information 216b may be added to object identifier data 110b generated from the RFID tag 102b. Even though the object identifier data 110 for the two object identifiers 102 is the same, the supplemental information 216 enables the input filter 416 to distinguish the object identifier data 110a generated from the UPC bar code 102a and the object identifier data 110b generated from the RFID tag 102b. Thus, the input filter 416 is able to apply the appropriate input rule 518a.

As mentioned previously, in some embodiments, the object identifier reader 104 may pass the supplemental information 216 as a prefix to the object identifier data 110 read from the object identifier 102. For example, a barcode reader might prefix data read from a UPC code with the AIM identifier for UPC. Rules 518a in the code filter/router 114 may be written to match the supplemental information 216 (e.g., the symbology prefix in the previous example), which is typically removed after matching. This is illustrated in the following example input filter rules 518a:

```
rule 1: #ten digit UPC is SKU tag
    match "<UPC> [0-9] {10}"
    delete "<UPC>"
    tag "SKU"
    accept buffer
rule 2: #ten digit Code39 is LotNumber tag
    match "<Code39> [0-9] {10}"
    delete "<Code39>"
    tag "LotNumber"
    accept buffer
``` rule 3: #for any other data, just remove the symbology prefix
match "<.*>.*"
delete "<.*>"
passthrough buffer The input rules 418 may also be used to determine a characteristic of the information 212 that has been identified 304 within object identifier data 110. Determining a characteristic of the information 212 may be one of the steps involved in identifying 306 one or more applications 106 to receive the information 212, as previously mentioned. In one embodiment, an input rule 518 may include one or more instructions 522 to associate the information 212 with a tag that describes a characteristic of the information 212. For example, if the information 212 in the object identifier data 110 is a part number, the input rule 518 that matches the object identifier data 110 may include an instruction 522 to associate the information 212 with the following tag: "partnumber." Accordingly, determining a characteristic of the information 212 that has been identified 304 within object identifier data 110 may simply involve following one or more of the instructions 522 contained in the input rule 518 that matches the object identifier data 110.

Sometimes object identifier data 110 may match more than one input rule 518. In one embodiment, the user may be prompted to select which input rule 518 should be used. For example, one input rule 518 may include an instruction 522 to match "PNR<any number of digits>", and another input rule 518 may include an instruction 522 to match "PN<any four characters>." If the object identifier data 110 received from the object identifier reader 104 is "PNR9999," this matches both input rules 518. With the user-resolution feature, the user may be prompted to choose which input rule 518 should be used. In another embodiment, input rules 518 that may potentially conflict may be assigned a priority so that the higher priority rule is automatically used when the object identifier data 110 matches more than one input rule 518. In yet another embodiment, the input rule 518 that matches the longer portion of the object identifier data 110 may be automatically selected.

Figure 5B:
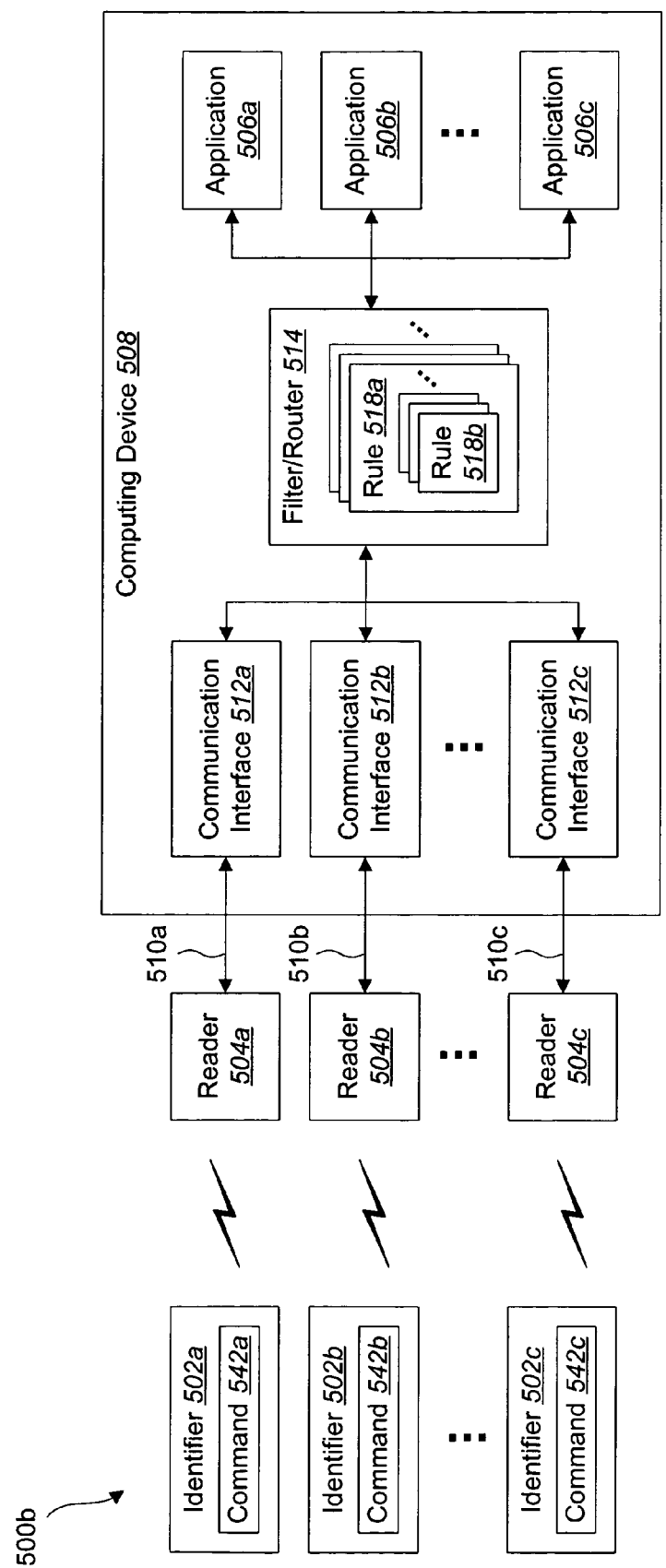
FIG. 5B is a block diagram illustrating another system in which some embodiments may be practiced.

FIG. 5B is a block diagram illustrating another system 500b in which some embodiments may be practiced. The system 500b includes a computing device 508, one or more object identifiers 502, and one or more object identifier readers 504. In FIG. 5B, each object identifier reader 504 in the system 500b is in communication with the computing device 508 through a communication interface 512. In alternative embodiments, the object identifier readers 504 may comprise hardware and software components that are incorporated directly into the computing device 508. Alternatively still, there may be a combination of separate object identifier reader units connected to the computing device 508 by communication interfaces 512 and object identifier reader components incorporated directly into the computing device 508.

The system 500b includes a filter/router system 514 and one or more applications 506. The applications 506 are in electronic communication with the filter/router system 514. In the illustrated embodiment, the applications 506 are located on the same computing device 508 as the filter/router system 514. Alternatively, however, the filter/router system 514 and the one or more applications 506 may be located on different computing devices 508. In such embodiments, communication between the filter/router system 514 and the one or more applications 506 may occur via a communication interface 512 such as TCP/IP over a wired or a wireless network, RS-232, USB, bluetooth, etc.

The filter/router system 514 includes a plurality of rules 518. As described previously, each rule 518 may include a pattern and one or more instructions to perform specified operations on object identifier data 510 that matches the pattern. Some of the rules 518 may be mutually exclusive. Rules 518 or sets of rules 518 may be activated and/or deactivated so that at most one of a set of mutually exclusive rules 518 is active at any given time.

Commands 542 to activate or deactivate rules 518 may be referred to herein as activation commands 542, deactivation commands 542, or activation/deactivation commands 542. Such commands 542 may be contained within object identifiers 502, as shown in FIG. 5B. Thus, sets of rules 518 may be activated and/or deactivated by reading one or more object identifiers 502. When an object identifier reader 504 reads an object identifier 502, the object identifier reader 504 may generate object identifier data 510 and send the object identifier data 510 to the computing device 508 via a particular communication interface 512. It may then be determined whether the object identifier data 510 includes any activation/deactivation commands 542. If so, the activation/deactivation commands 542 may be carried out. The active rules 518 may then be applied to the object identifier data 510, as described in greater detail elsewhere herein.

Alternatively, or in addition, activation/deactivation commands 542 may be sent by an application 506 that is in communication with the filter/router 514. The application 506 may be on the same computing device 508 as the filter/router 514. Alternatively, the application 506 may be on a different computing device 508 than the filter/router 514. The application 506 may send the command to the filter/router 514 in a variety of ways. For example, the application 506 may send an operating system message (e.g., post a Windows message). Alternatively, the application 506 may send a command over the same communication interface 512 as used by the filter/router 514 to send data to the application 506 (e.g., a TCP/IP socket).

In some embodiments, a command 542 to activate a particular set of rules 518 may also include a command 542 to first deactivate all of the rules 518 on the computing device 508. This ensures that only the rules 518 that are being activated with the command 542 are applied to the object identifier data 510.

In some embodiments, activation/deactivation commands 542 may be part of the input rules 518. In other words, new commands 542 for activate/deactivate may be specified in an input rules file 518 along with transform commands, and the filter/router 514 can transform object identifier data 510 into the activation/deactivation commands 542. Thus, object identifier data 510 containing a pattern 520 not normally recognized as an activation/deactivation command 542 can be recognized as such using the input rules 518. The input rules 518 may include other types of system control commands as well.

As shown, some of the rules 518 within the filter/router system 514 may be nested. In other words, the filter/router system 514 may include a parent rule 518a and one or more child rules 518b. In some embodiments, the rules may be nested according to a "top-down" approach, i.e., the parent rule 518a may include a call to one or more child rules 518b. Alternatively, the rules 518 may be nested according to a "bottom-up" approach, i.e., the child rule 518b may include a field that identifies its parent rule 518a. In both embodiments, activating (or deactivating) a set of rules 518 involves activating (or deactivating) the parent rule 518a.

An example illustrating some of the above principles will now be discussed. Suppose that certain rules 518 are defined for items received from Supplier A, and that other rules 518 are defined for items received from Supplier B. More specifically, suppose that from Supplier A, a ten-digit numeric code indicates a four-digit plant number and a six-digit lot number. However, from Supplier B, a ten-digit numeric code indicates a two-digit plant number, a three-digit lot number, and a five-digit part group number. Rule Set A converts any ten-digit code to a plant number element and a lot number element according to the format of Supplier A. Rule Set A also provides a Supplier element with contents "A". Rule Set B converts any ten-digit code into a plant number element and a lot number element according to the format of Supplier B (it discards the unneeded part group number from the Supplier B code). Rule Set B also provides a Supplier element with contents "B".

An example of Rule Set A is as follows:
"[0-9] {10}"
extractRange 0 4
tag "Plant"
accept extracted
tag "Lot"
accept buffer
tag "Supplier"
accept "A"

An example of Rule Set B is as follows:
"[0-9] {10}"
extractRange 0 2
tag "Plant"
accept extracted
extractRange 0 3
tag "Lot"
accept buffer
tag "Supplier"
accept "B"

The user may deactivate the Supplier A rules 518 while processing a shipment from Supplier B, and vice versa. In typical operation, to read object identifiers 502 from Supplier A, a user would deactivate Rule Set B, activate Rule Set A, and then read the object identifiers 502 from Supplier A. Similarly, to read object identifiers 502 from Supplier B, a user would deactivate Rule Set A, activate Rule Set B, and then read the object identifiers 502 from Supplier B.

In one embodiment, the CFR 114 receives object identifier data 110 from an object identifier reader 104 one character at a time. When a new character is received, the CFR 114 may be configured to add the character to a buffer. At some point, a decision must be made as to whether the object identifier data 110 in the buffer matches an input rule 518.

In some circumstances, it may take an indefinite period of time to make such a decision. This may be the case when, for example, an input rule 518 includes an instruction 522 to match a pattern 520 that includes a wildcard character. For example, suppose that an input rule 518 includes an instruction 522 to match "a[0-9]*b". In this example, assume that the "*" character indicates that the previous character (or range of characters) may be repeated any number of times. Further suppose that the object identifier data 110 in the buffer is "a12123123". The CFR 114 may be configured to wait to decide whether the object identifier data 110 matches the pattern 520 until it 114 receives either a "b" or another character that is not a number. This may take a very long time.

In one embodiment, the multi-input filter 416 may be configured to make a decision about whether the object identifier data 110 in the buffer matches a pattern 520 in an input rule 518 after a specified period of inactivity. In other words, the multi-input filter 416 may be configured to "time out" after a period of inactivity. In the example above, the multi-input filter 416 may decide that there is no match between the "a12123123" and the "a[0-9]*b" pattern 520 after a period of inactivity.

The time out feature may be implemented by treating a time out condition as a special reserved input symbol (outside the normal character set) called a time out character. The time out character may be added to the object identifier data 110 in the buffer after a period of inactivity. The time out character may be removed from the object identifier data 110 when the object identifier data 110 is processed.

The following examples illustrate various types of instructions 522 that may be contained within the input rules 518, and how those instructions 522 maybe carried out on object identifier data 110 received from an object identifier reader 104.

EXAMPLE 1

The Spec2000_PNR input rule 518 contains the following instructions 522:
rule(Spec2000_PNR_Prefix)
rule(Spec2000_Data)

The Spec2000_PNR_Prefix input rule 518 contains the following instructions 522:
extract("PNR")
tag("part-number")

The Spec2000_Data input rule 518 contains the following instructions 522:
extract("[^/]*")
accept(extracted)
extract("/?")

Suppose that the object identifier data 110 received from an object identifier reader 104 is "PNR 12345/MFR 999". The Spec2000_PNR input rule 518 will match "PNR 12345/". A tag/information pair of (part-number, 12345) will be sent to the router 420. "MFR 999" will be left in the input buffer and may be matched against another input rule 518.

EXAMPLE 2

An input rule 518 contains the following instructions 522:
match("(1-)?[0-9][0-9][0-9]-[0-9][0-9][0-9]-[0-9][0-9][0-9][0-9]")
deleteAll("-")
tag("phone-number")
accept(buffer)

Suppose that the object identifier data 110 received from an object identifier reader 104 is "call 1-800-228-2600 now." The input rule 518 will match "1-800-228-2600". A tag/information pair of (phone-number, 18002282600) will be sent to the router 420. The words "call" and "now" will not be recognized by the input rule 518.

EXAMPLE 3

The CodeXML_Sequence input rule 518 contains the following instructions 522:
match("<SOH>X[<RS><GS>][^<EOT>]*[<EOT>]")
extract("<SOH>X")
rule(CodeXML_Fields)*
extract("[<EOT>]")

The CodeXML_Fields input rule 518 contains the following instructions 522:
rule(codeXML_tag) | rule(codeXML_shortCode)

The CodeXML_Tag input rule 518 contains the following instructions 522:
extract("<RS>")
extract("[^/]*")
tag(extracted)
extract("/")
extract("[^<GS><RS><EOT>]")
accept(extracted)

The CodeXML_ShortCode input rule 518 contains the following instructions:
translate("<GS>", "@")
extract("[^<GS><RS><EOT>]")
tag(extracted)
accept("")

Suppose that the object identifier data 110 received from an object identifier reader 104 is "<SOH>X<RS>001/John<RS>002/Doe<EOT>". Two tag/information pairs will be sent to the router 420: (001, John) and (002, Doe).

Suppose instead that the object identifier data 110 received from an object identifier reader 104 is "<SOH>X<GS>Abcde<EOT>". One tag/information pair may be sent to the router 420: (@Abcde, ""). (The "@" indicates a data reference, which may be subsequently processed according to the techniques described in copending U.S. application Ser. No. 10/121,347, entitled System and Method for Encoding and Decoding Data and References to Data in Machine-Readable Graphical Codes, which is hereby incorporated by reference.)

EXAMPLE 4

The PartNumber input rule 518 includes the following instructions 522:
rule(PN16)|rule(PN8)

The PN16 input rule 518 includes the following instructions 522:
match("[0-9][0-9][0-9][0-9][0-9][0-9][0-9][0-9][0-9][0-9][0-9][0-9][0-9][0-9][0-9][0-9]")
tag("part-number")
accept(buffer)

The PN8 input rule 518 includes the following instructions 522:
match("[0-9][0-9][0-9][0-9][0-9][0-9][0-9][0-9]<timeout>")
insert(buffer, beginning, "00000000")
tag("part-number")
accept(buffer)

Suppose that the object identifier data 110 received from an object identifier reader 104 is "1234567890123456". The PN16 input rule 518 will match the object identifier data 110. A tag/information pair of (part-number, 1234567890123456) will be sent to the router 420.

Suppose instead that the object identifier data 110 received from an object identifier reader 104 is "12345678". The PN8 input rule 518 will match the object identifier data 110. A tag/information pair of (part-number, 0000000012345678) will be sent to the router 420.

The input rules 418 may be implemented with a parser. This may be readily accomplished by someone of ordinary skill in the field of lexical analysis and parsing. Tools such as Lex, Flex, Yacc, and Bison may be used to implement suitable parsers. Regular expression libraries and implementation techniques are also well known, as are recursive descent, LALR, and other parsing techniques. A good reference is *Compilers: Principles, Techniques, and Tools*, Aho et al, Addison-Wesley, 1986, which is hereby incorporated by reference in its entirety.

As stated previously, the multi-input filter 416 may be configured to determine a characteristic of the information 212, and to send the information 212 and the associated characteristic to the router 420. In one embodiment, the multi-input filter 416 may organize multiple information 212/characteristic pairs into a group. The information 212 in the group may then be formatted 308 and sent 310 to one or more applications 106.

For example, the following information 212/characteristic pairs may be organized into a group:

| Information | Characteristic |
|---|---|
| 12345 | Product ID |
| Acme | Manufacturer |
| 11 | Lot Number |
| 2002/03/29 | Date of Manufacture |

If the above group of information 212/characteristic pairs are formatted 308 for a web browser application 106, the formatted information 212 may be the following URL: <http://somecompany.com/partLookup.php?id=12345&manuf=Acme&lot=11&manuf_date=200 20329>. The router 420 may then send 310 the URL to the web browser application 106, which may then process the URL and display results to the user.

In one embodiment, the CFR 114 may include a pre-filter associated with a particular communication interface 112. The purpose of the pre-filter would be to preserve data that may be lost from the object identifier data 110. For example, if the pre-filter is associated with a communication interface 112 that includes the keyboard port, the pre-filter may be configured to preserve non-printable keyboard sequences (e.g., Alt+Tab).

For example, suppose that an object identifier reader 104 is configured to send object identifier data 110 to the computing device 108 through the keyboard port, and that the object identifier reader 104 sends the object identifier data 110 in one of the following three formats:

```
           key
|    shift↓ key shift↑
|        alt↓ decimal-ascii-code alt↑
where:
key:            ~|1|2|3|4|5|6|7|8|9|0|-|=
|    q|w|e|r|t|y|u|i|o|p|[|]|\
|    a|s|d|f|g|h|j|k|l|;|'
|    z|x|c|v|b|n|m|,|.|/
|    space
decimal-ascii-code:  digit | digit digit | digit digit digit (range [0, 255])
digit:              keypad|keypad1|keypad2|keypad3|keypad4
|    keypad5|keypad6|keypad7|keypad8|keypad9
```

The pre-filter may be configured so that any keyboard sequence that does not match one of these formats will not be sent to the CFR 114 but rather will pass through the pre-filter unmodified.

Figure 6:
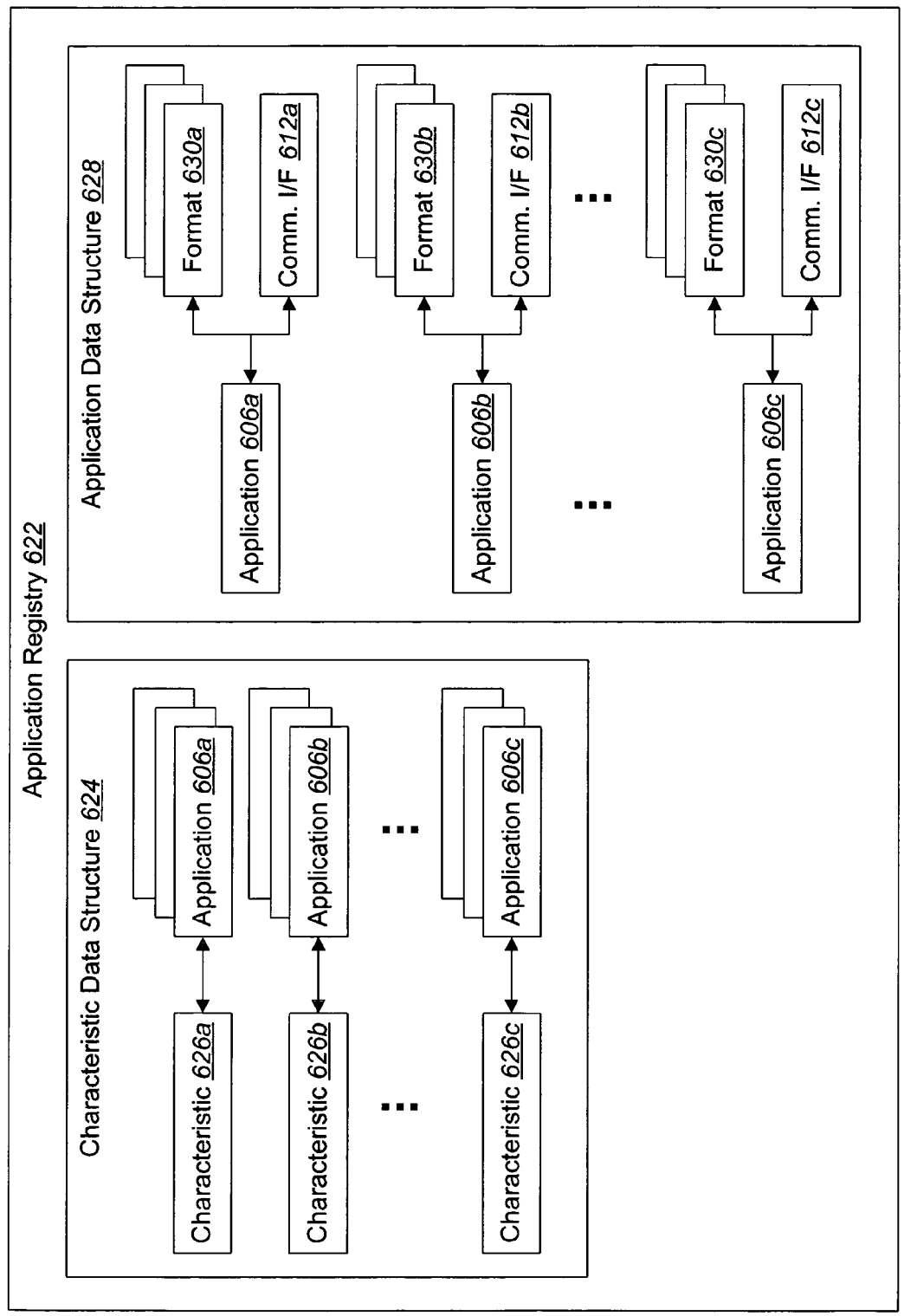
FIG. 6 is a block diagram of an embodiment of an application registry.

FIG. 6 is a block diagram of an embodiment of an application registry 622. As stated previously, identifying 306 one or more applications 106 to receive the information 212 contained within object identifier data 110 may involve determining a characteristic 626 of the information 212 and identifying one or more applications 606 that are configured to process information 212 having that characteristic 626.

In one embodiment, some or all of the characteristics 626 that may potentially be associated with information 212 processed by the CFR 114 may be included in a characteristic data structure 624 within the application registry 622. One or more applications 606 may be associated with each characteristic 626. In such an embodiment, identifying one or more applications 606 that are configured to process information 212 having a particular characteristic 626 may involve searching the application registry 622 for applications 606 associated with a particular characteristic 626.

As shown, the application registry 622 may also include an application data structure 628. Some or all of the applications 606 to which the CFR 114 may send 310 information 212 may be included in the application data structure 628. Each application 606 may be associated with one or more object identifier formats 630. If an application 606 is associated with a particular object identifier format 630, this means that the application 606 expects to receive the information 212 in that object identifier format 630. Examples of different object identifier formats 630 include codeXML, SPEC2000, ANSI MH10.8.3, and the like, as well as various proprietary formats.

As stated previously, formatting 308 the information 212 so that a particular application 606 can process the information 212 may involve identifying the object identifier format 630 associated with the application 606. In one embodiment, identifying the object identifier format 630 associated with an application 606 may involve searching the characteristic data structure 624 in the application registry 622 for the object identifier format 630 associated with the application 606.

Each application 606 in the application data structure 628 may also be associated with a communication interface 612. If an application 606 is associated with a particular communication interface 612, this means that the application 606 expects to receive the information 212 through that communication interface 632.

As stated previously, sending 310 the formatted information 212 to an application 106 may involve identifying the communication interface 612 associated with the application 606. In one embodiment, identifying the communication interface 612 associated with an application 606 may involve searching the application data structure 628 in the application registry 622 for the communication interface 612 associated with the application 606.

In some embodiments, the input rules 418 may include commands to change entries in the application registry 622. Such commands may be specified in an input rules file 418 along with transform commands, and the CFR 114 can transform object identifier data 110 into the commands. In this way, a user may change entries in the application registry 622 by simply reading an object identifier 102. The commands may change the application(s) 606 associated with one or more characteristics 626, the format(s) 630 and/or communication interface(s) 612 associated with one or more applications 606, etc. The input rules 418 may include other types of system control commands as well.

Figure 7:
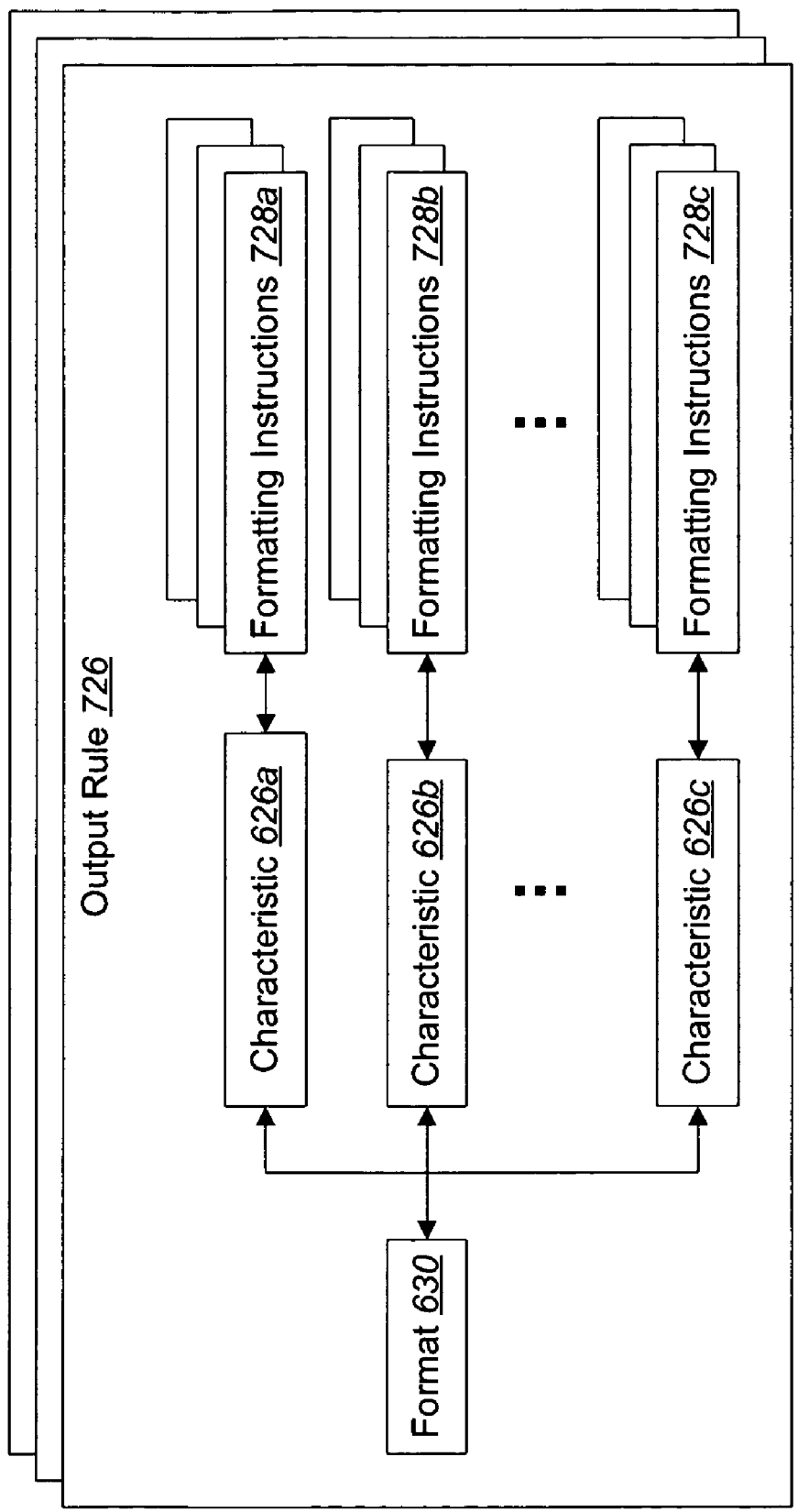
FIG. 7 is a block diagram of an embodiment of the output rules.

FIG. 7 is a block diagram of an embodiment of the output rules 726. As shown, each output rule 726 may correspond to a particular object identifier format 630. The object identifier format 630 may be associated with one or more characteristics 626 of information 212 that may be processed by the CFR 114. Each characteristic 626 may be associated with one or more formatting instructions 728. Examples of formatting instructions 728 include instructions to add formatting characters 214 (e.g., a field identifier, a tag, a tag terminator, a tag-content separator, a field terminator, a field separator, one or more pad characters, etc.). Alternatively, formatting instructions 728 may include instructions to arrange the information 212 itself in a particular way. Numerous additional formatting instructions 728 will be readily apparent to those skilled in the art in light of the teachings contained herein.

As stated previously, once an application 106 has been identified 306 to receive information 212, the CFR 414 may be configured to format 308 the information 212 so that the application 106 can process the information 212. In one embodiment, as described above, the multi-output filter 424 receives the information 212, a characteristic 626 of the information 212, and the object identifier format 630 associated with the application 106 that is to receive the information 212. In such an embodiment, the multi-output filter 424 may then identify formatting instructions 728 associated with the characteristic 626 and the object identifier format 630. Identifying formatting instructions 728 may involve locating an output rule 726 that corresponds to the object identifier format 630 associated with the application 106, identifying the characteristic 626 associated with the information 212 in the output rule 726, and identifying the formatting instructions 728 associated with the characteristic 626.

Once formatting instructions 728 have been identified, the multi-output filter 424 may then format the information 212 according to the formatting instructions 728. For example, if the formatting instructions 728 include instructions to add one or more formatting characters 214 to the information 212, the multi-output filter 424 may format the information 212 by adding the specified formatting characters 214 to the information 212. The formatted information 212 may then be sent to the application 106.

The output rules 726 may specify that certain object identifier data 110 may not be used with certain other object identifier data 110, or that certain object identifier data 110 must always be used with certain other object identifier data 110. If the output rules 726 are violated, the invalid object identifier data 110 may be removed. A warning message may be displayed to the user and may be recorded in a log database.

In one embodiment, input rules 518 and output rules 726 may be shared between separate instances of the CFR 114. For example, an input rule 518 and/or an output rule 726 may be defined in one instance of the CFR 114 and propagated to another instance of the CFR 114. Input rules 518 and output rules 726 may be shared via a central rules server or via peer-to-peer networking.

FIG. 8 is a table 800 illustrating an embodiment of the formatting instructions 828. The table 800 may include a plurality of rows 830 and columns 832. Each row 830 may include the formatting instructions 828 associated with a particular object identifier format 630 and a particular characteristic 626. As shown, the formatting instructions 828 may include instructions to add formatting characters 214 (e.g., a field identifier, a tag, a tag terminator, a tag-content separator, a field terminator, a field separator, one or more pad characters, etc.). The formatting instructions 828 may also include instructions to arrange the information 212 in a particular way (e.g., according to a content format string).

As discussed previously, a characteristic 626 may be associated with one or more formatting instructions 828 in an output rule 726. In one embodiment, this may be accomplished by associating a characteristic 626 with a pointer to a particular row in a table 800, such as the table 800 shown in FIG. 8.

FIG. 9 is a table 900 which may be used to organize the formatting instructions 828 into groups. The table 900 shown in FIG. 9 includes two columns 902*a*, *b*. The first column 902*a* includes the names of different sets of formatting instructions 828. The second column 902*b* includes groups into which the formatting instructions 828 may be organized.

FIG. 10 is another table 1000 which may be used to organize the formatting instructions 828. In certain embodiments, some formatting instructions 828 may not be used with other formatting instructions 828. The table 1000 shown in FIG. 10 includes two columns 1002*a*, *b* and multiple rows 1004. Each column 1002 includes formatting instructions 828. In one embodiment, the formatting instructions 828 in the same row 1004 may not be used with one another.

Figure 11:
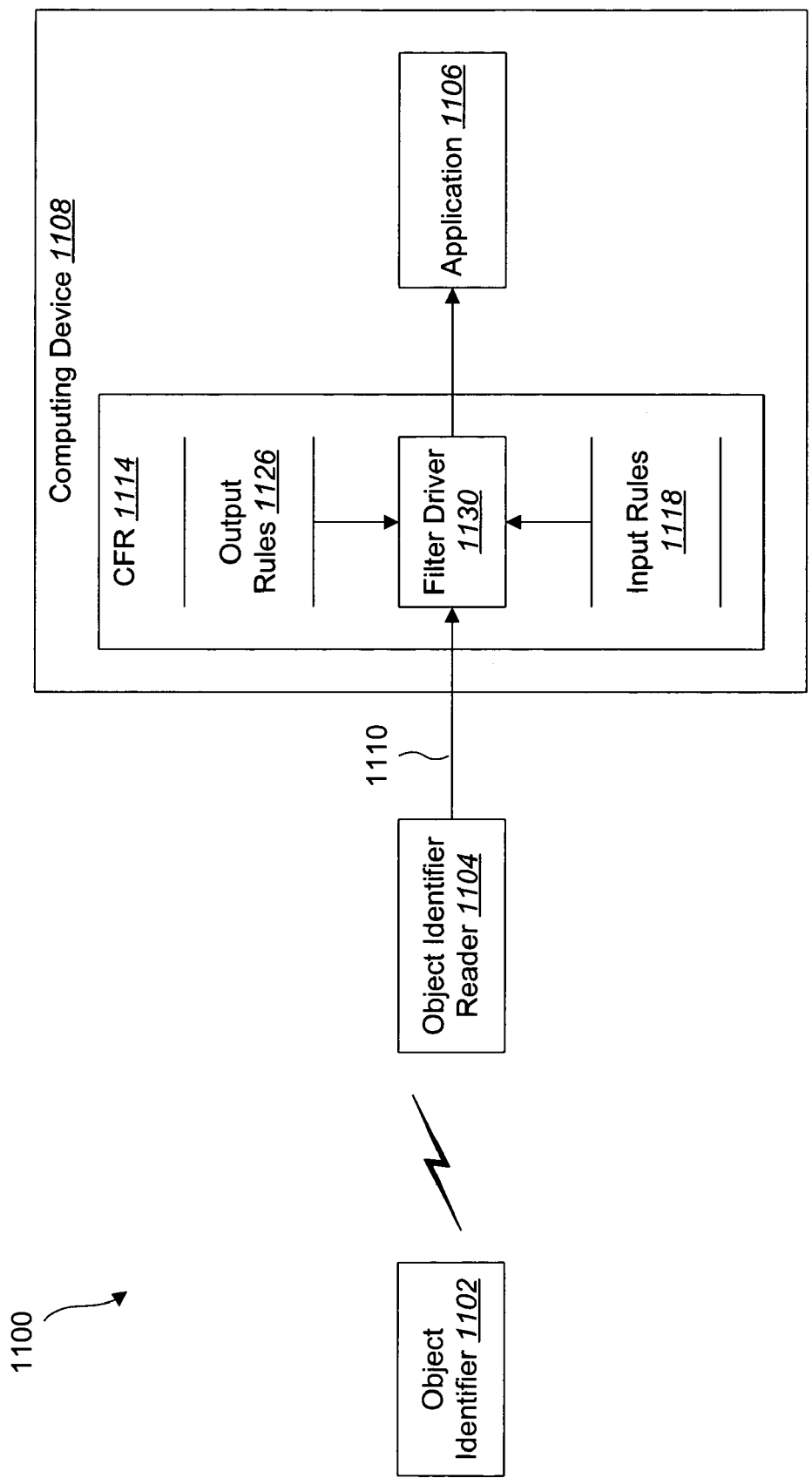
FIG. 11 is a block diagram of an alternative embodiment of a system for interfacing multiple types of object identifiers and object identifier readers to multiple types of applications.

FIG. 11 is a block diagram of an alternative embodiment of a system 1100 for interfacing multiple types of object identifiers 1102 and object identifier readers 1104 to multiple types of applications 1106. In the embodiment shown in FIG. 11, the system 1110 includes a computing device 1108 that includes a CFR 1114 in communication with an application 1106. As shown, the CFR 1114 and the application 1106 may be located on the same computing device 1108. Alternatively, the CFR 1114 and the application 1106 may be located on different computing devices 1108.

The CFR 1114 includes one or more input rules 1118 and one or more output rules 1126. The CFR 1114 also includes a filter driver 1130. As described previously, the filter driver 1130 is a facility for receiving data from a communication port, modifying it or otherwise filtering it, and then sending the data to its appropriate destination. Typically, the filter driver 1130 is part of an operating system (not shown) that is running on the computing device 1108.

As shown, the filter driver 1130 may receive object identifier data 1110 from an object identifier reader 1104. The filter driver 1130 may be configured to determine whether the application 1106 can process the object identifier data 1110. This may involve matching the object identifier data 1110 with an input rule 1118, as described previously. If the application 1106 can process the object identifier data 1110, the filter driver 1130 may then send the unmodified object identifier data 1110 to the application 1106. If the application 1106 cannot process the object identifier data 1110, the filter driver 1130 may identify 304 the information 212 in the object identifier data 1110 and format 308 the information 212 so that the application 1106 can process the information 212. This may involve identifying formatting instructions 728 in the output rules 1126, as described previously. The filter driver 1130 may then send the formatted information 212 to the application 1106.

Figure 12:
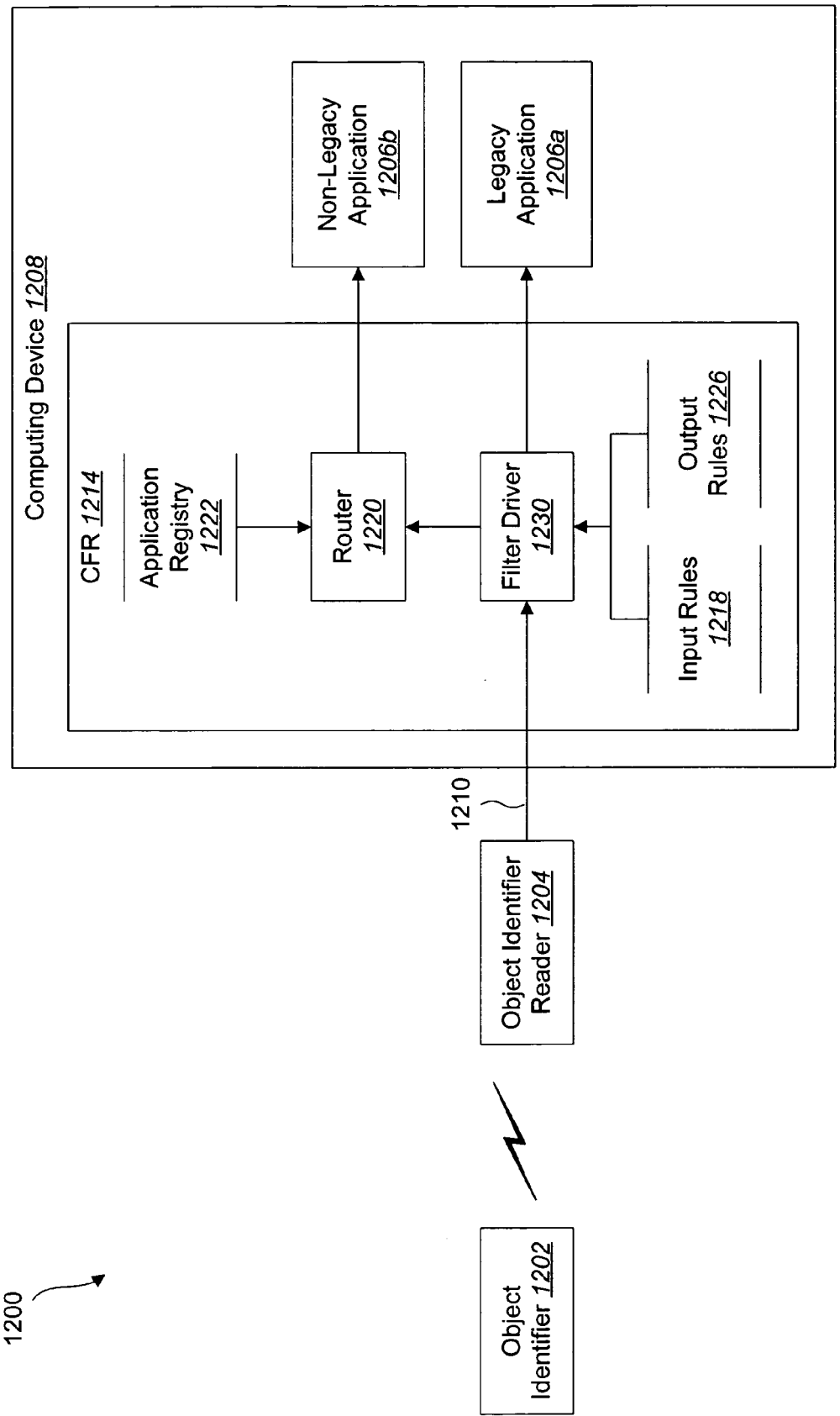
FIG. 12 is a block diagram of an alternative embodiment of a system for interfacing multiple types of object identifiers and object identifier readers to multiple types of applications.

FIG. 12 is a block diagram of an alternative embodiment of a system 1200 for interfacing multiple types of object identifiers 1202 and object identifier readers 1204 to multiple types of applications 1206. In the embodiment shown in FIG. 12, the system 1200 includes a computing device 1208 that includes a CFR 1214. The CFR 1214 includes one or more input rules 1218, one or more output rules 1226, a filter driver 1230, a router 1220, and an application registry 1222. Two applications 1206 are in communication with the CFR 1214: a legacy application 1206*a*, and a non-legacy application 1206*b*. The legacy application 1206*a* is configured to receive object identifier data 1210 from the filter driver 1230. The non-legacy application 1206*b* is configured to receive object identifier 1210 through a communication interface 112 other than the filter driver 1230.

As shown, the filter driver 1230 may receive object identifier data 1210 from an object identifier reader 1204. The filter driver 1230 may be configured to determine whether the legacy application 1206*a* can process the object identifier data 1210. This may involve matching the object identifier data 1210 with an input rule 1218, as described previously. If the legacy application 1206*a* can process the object identifier data 1210, the filter driver 1230 may then send the unmodified object identifier data 1210 to the legacy application 1206*a*. If the legacy application 1206*a* cannot process the object identifier data 1210, the filter driver 1230 may format 308 the information 212 so that the legacy application 1206*a* can process the information 212. Alternatively or in addition, the filter driver 1230 may send the object identifier data 1210 to the router 1220. The router 1220 may be configured to format 308 the information 212 in the object identifier data 1210 so that the non-legacy application 1206*b* can process the information 212. The router 1220 may then send the formatted information 212 to the non-legacy application 1206*b* through a communication interface 112 specified in the application registry 1222.

Figure 13:
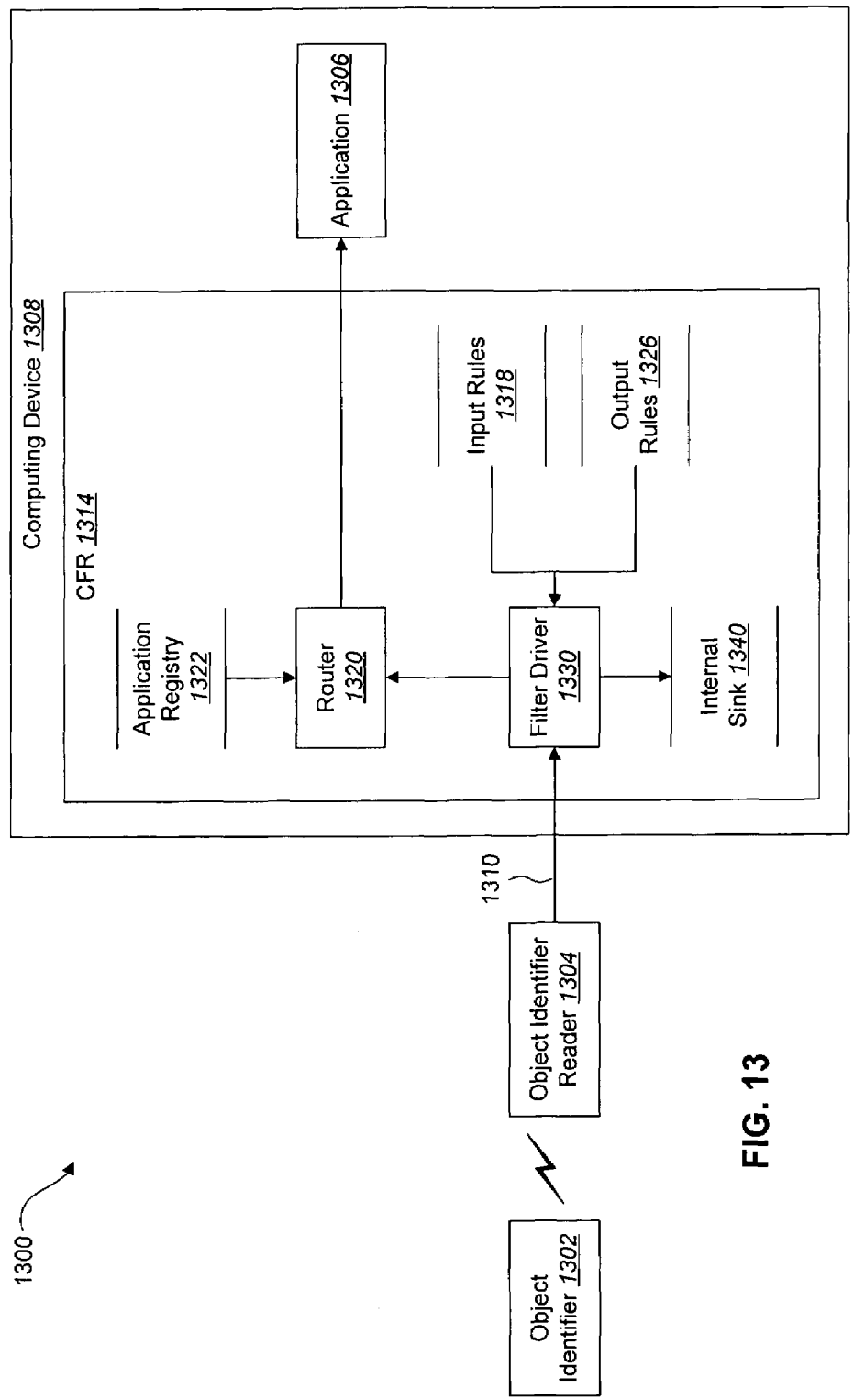
FIG. 13 is a block diagram of an alternative embodiment of a system for interfacing multiple types of object identifiers and object identifier readers to multiple types of applications.

FIG. 13 is a block diagram of an alternative embodiment of a system 1300 for interfacing multiple types of object identifiers 1302 and object identifier readers 1304 to multiple types of applications 1306. In the embodiment shown in FIG. 13, the system 1300 includes a computing device 1308 that includes a CFR 1314. The system 1300 also includes an application 1306 in communication with the CFR 1314. The CFR 1314 includes one or more input rules 1318, one or more output rules 1326, a filter driver 1330, a router 1320, an application registry 1322, and an internal sink 1340.

As shown, the filter driver 1330 may receive object identifier data 1310 from an object identifier reader 1304. The filter driver 1330 may be configured to identify 304 the information 212 in the object identifier data 1310. This may involve matching the object identifier data 1310 with an input rule 1318, as described previously. If the information 212 in the object identifier data 1310 cannot be identified 304, the filter driver 1330 may be configured to delete the object identifier data 1310 by sending it 1310 to an internal sink 1340.

If the information 212 in the object identifier data 1310 can be identified 304, the filter driver 1330 may send the object identifier data 1310 to the router 1320. The router 1320 maybe configured to format 308 the information 212 in the object identifier data 1310 so that the application 1306 can process the information 212. The router 1320 may then send the formatted information 212 to the application 1306 through a communication interface 112 specified in the application registry 1322.

Figure 14:
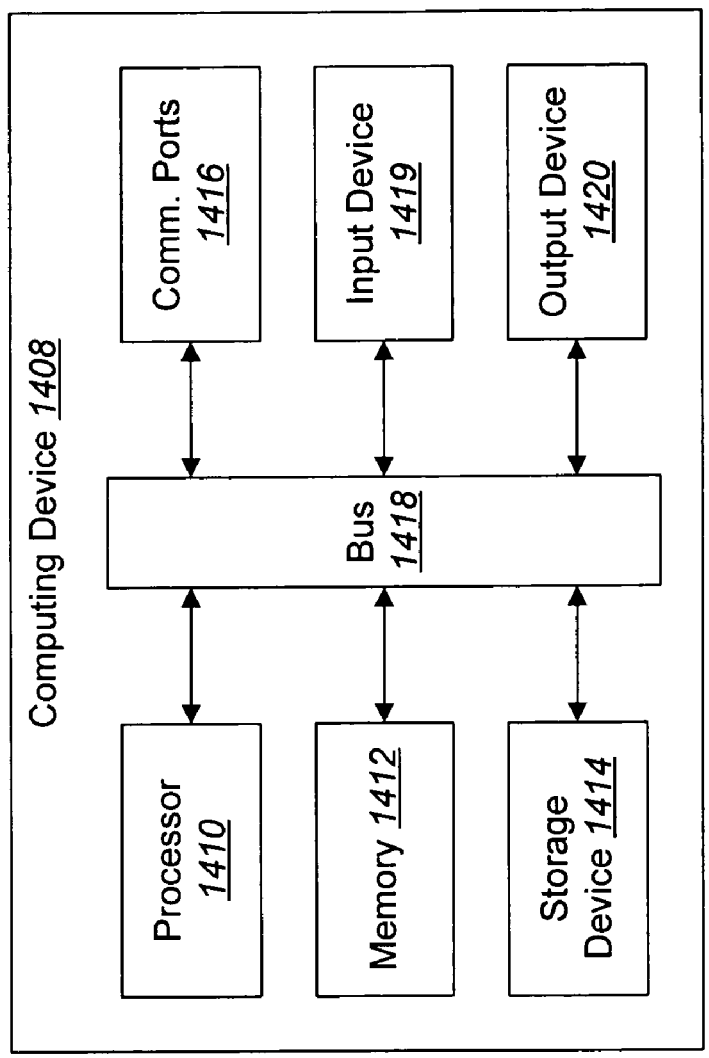
FIG. 14 is a block diagram of hardware components that may be used in an embodiment of a computing device.

FIG. 14 is a block diagram of hardware components that may be used in an embodiment of a computing device 1408. Many different types of computer systems may be used to implement the computing device 1408 illustrated herein. The diagram of FIG. 14 illustrates typical components of a computing device 1408 including a processor 1410, memory 1412, a storage device 1414, and one or more communication ports 1416. A bus 1418 electronically couples all of the components in the computing device 1408. Each of these components is known to those skilled in the art.

It will be appreciated by those skilled in the art that more components may be included in the computing device 1408. For example, several input devices 1419 may be included, such as a keyboard, a mouse, a joystick, etc. In addition, several output devices 1420 maybe included such as a display screen, a printer, etc. Thus, those skilled in the art will appreciate that additional components may be added to the computing device 1408 without detracting from the functionality to serve as a computing device 1408.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention. Those skilled in the art will recognize that the data recognition, transformation, and routing functionality (input filter, router, and/or output filter) could be implemented using an embedded general-purpose scripting engine such as Awk, Perl, Python, JavaScript, etc.

What is claimed is:

1. A computing device for processing object identifier data corresponding to an object identifier, comprising:
    a processor;
    memory in electronic communication with the processor; and
    instructions stored in the memory, the instructions being executable to implement a method comprising:
        obtaining the object identifier data;
        obtaining supplemental information about the object identifier, wherein the supplemental information identifies a symbology of the object identifier;
        matching the object identifier data with a first pattern associated with a first rule that comprises first instructions;
        matching the object identifier data with a second pattern associated with a second rule that comprises second instructions; and
        using the symbology of the object identifier to determine which of the first rule and the second rule are applied to the object identifier data.

2. The computing device of claim 1, further comprising an object identifier reader, the object identifier reader being a set of hardware and software components integrated into the computing device, and wherein obtaining the object identifier data comprises reading the object identifier.

3. The computing device of claim 1, wherein obtaining the object identifier data comprises receiving the object identifier data from an object identifier reader, and wherein the object identifier reader is a separate device connected to the computing device via a communication interface.

4. The computing device of claim 3, wherein obtaining the supplemental information comprises receiving the supplemental information from the object identifier reader.

5. The computing device of claim 3, wherein obtaining the supplemental information comprises:
    determining the communication interface through which the object identifier data is received; and
    determining the supplemental information associated with the communication interface.

6. A computing device for processing object identifier data corresponding to an object identifier, comprising:
    a processor;
    memory in electronic communication with the processor; and
    instructions stored in the memory, the instructions being executable to implement a method comprising:
        obtaining the object identifier data;
        identifying information in the object identifier data;
        identifying a first application to receive the information;
        identifying a second application to receive the information;
        sending the information to the first application in a first format; and
        sending the information to the second application in a second format.

7. The computing device of claim 6, wherein obtaining the object identifier data comprises receiving the object identifier data from an object identifier reader, and wherein the object identifier reader is a separate device connected to the computing device via a communication interface.

8. The computing device of claim 6, further comprising an object identifier reader, the object identifier reader being a set of hardware and software components integrated into the computing device, and wherein obtaining the object identifier data comprises reading the object identifier.

9. The computing device of claim 6, wherein the second format is the same as the first format.

10. A computing device for processing object identifier data corresponding to an object identifier, comprising:
    a processor;
    memory in electronic communication with the processor; and
    instructions stored in the memory, the instructions being executable to implement a method comprising:
        obtaining the object identifier data;
        identifying information in the object identifier data;
        identifying an application to receive the information;
        sending the information to the application in a first format; and
        sending the information to the application in a second format that is different from the first format.

11. The computing device of claim 10, wherein obtaining the object identifier data comprises receiving the object identifier data from an object identifier reader, and wherein the object identifier reader is a separate device connected to the computing device via a communication interface.

12. The computing device of claim 10, further comprising an object identifier reader, the object identifier reader being a set of hardware and software components integrated into the computing device, and wherein obtaining the object identifier data comprises reading the object identifier.

13. A computing device for processing object identifier data corresponding to an object identifier, comprising:
    a processor;
    memory in electronic communication with the processor; and
    instructions stored in the memory, the instructions being executable to implement a method comprising:
        obtaining the object identifier data;
        identifying object identifier information in the object identifier data;
        forming a first element that comprises first element information and a first characteristic, wherein the first element information comprises a first portion of the object identifier information; and
        forming a second element that comprises second element information and a second characteristic, wherein the second element information comprises the first portion of the object identifier information.

14. The computing device of claim 13, wherein obtaining the object identifier data comprises receiving the object identifier data from an object identifier reader, and wherein the object identifier reader is a separate device connected to the computing device via a communication interface.

15. The computing device of claim 13, further comprising an object identifier reader, the object identifier reader being a set of hardware and software components integrated into the computing device, and wherein obtaining the object identifier data comprises reading the object identifier.

16. The computing device of claim 13, wherein the first element information further comprises a second portion of the object identifier information.

17. A computing device for processing object identifier data corresponding to an object identifier, comprising:
   a processor;
   memory in electronic communication with the processor; and
   instructions stored in the memory, the instructions being executable to implement a method comprising:
      obtaining the object identifier data;
      determining whether a command has been received to activate a first rule of a plurality of rules; and
      if the command has been received, activating the first rule and applying the first rule to the object identifier data.

18. The computing device of claim 17, wherein obtaining the object identifier data comprises receiving the object identifier data from an object identifier reader, and wherein the object identifier reader is a separate device connected to the computing device via a communication interface.

19. The computing device of claim 17, further comprising an object identifier reader, the object identifier reader being a set of hardware and software components integrated into the computing device, and wherein obtaining the object identifier data comprises reading the object identifier.

20. The computing device of claim 17, wherein the plurality of rules comprise a parent rule and a child rule, and wherein the child rule is only executed if the parent rule matches the object identifier data.

21. A computer-readable medium for storing program data, wherein the program data comprises executable instructions for implementing a method on a computing device, the method comprising:
   obtaining object identifier data corresponding to an object identifier;
   obtaining supplemental information about the object identifier, wherein the supplemental information identifies a symbology of the object identifier;
   matching the object identifier data with a first pattern associated with a first rule that comprises first instructions;
   matching the object identifier data with a second pattern associated with a second rule that comprises second instructions; and
   using the symbology of the object identifier to determine which of the first rule and the second rule are applied to the object identifier data.

22. The computer-readable medium of claim 21, wherein the computing device comprises an object identifier reader, the object identifier reader being a set of hardware and software components integrated into the computing device, and wherein obtaining the object identifier data comprises reading the object identifier.

23. The computer-readable medium of claim 21, wherein obtaining the object identifier data comprises receiving the object identifier data from an object identifier reader, and wherein the object identifier reader is a separate device connected to the computing device via a communication interface.

24. The computer-readable medium of claim 23, wherein obtaining the supplemental information comprises receiving the supplemental information from the object identifier reader.

25. The computer-readable medium of claim 23, wherein obtaining the supplemental information comprises:
   determining the communication interface through which the object identifier data is received; and
   determining the supplemental information associated with the communication interface.

26. A computer-readable medium for storing program data, wherein the program data comprises executable instructions for implementing a method on a computing device, the method comprising:
   obtaining object identifier data corresponding to an object identifier;
   identifying information in the object identifier data;
   identifying a first application to receive the information;
   identifying a second application to receive the information;
   sending the information to the first application in a first format; and
   sending the information to the second application in a second format.

27. The computer-readable medium of claim 26, wherein obtaining the object identifier data comprises receiving the object identifier data from an object identifier reader, and wherein the object identifier reader is a separate device connected to the computing device via a communication interface.

28. The computer-readable medium of claim 26, wherein the computing device comprises an object identifier reader, the object identifier reader being a set of hardware and software components integrated into the computing device, and wherein obtaining the object identifier data comprises reading the object identifier.

29. The computer-readable medium of claim 26, wherein the second format is the same as the first format.

30. A computer-readable medium for storing program data, wherein the program data comprises executable instructions for implementing a method on a computing device, the method comprising:
   obtaining object identifier data corresponding to an object identifier;
   identifying information in the object identifier data;
   identifying an application to receive the information;
   sending the information to the application in a first format; and
   sending the information to the application in a second format that is different from the first format.

31. The computer-readable medium of claim 30, wherein obtaining the object identifier data comprises receiving the object identifier data from an object identifier reader, and wherein the object identifier reader is a separate device connected to the computing device via a communication interface.

32. The computing device of claim 30, wherein the computing device comprises an object identifier reader, the object identifier reader being a set of hardware and software components integrated into the computing device, and wherein obtaining the object identifier data comprises reading the object identifier.

33. A computer-readable medium for storing program data, wherein the program data comprises executable instructions for implementing a method on a computing device, the method comprising:

obtaining object identifier data corresponding to an object identifier;

identifying object identifier information in the object identifier data;

forming a first element that comprises first element information and a first characteristic, wherein the first element information comprises a first portion of the object identifier information; and forming a second element that comprises second element information and a second characteristic, wherein the second element information comprises the first portion of the object identifier information.

34. The computer-readable medium of claim 33, wherein obtaining the object identifier data comprises receiving the object identifier data from an object identifier reader, and wherein the object identifier reader is a separate device connected to the computing device via a communication interface.

35. The computer-readable medium of claim 33, wherein the computing device comprises an object identifier reader, the object identifier reader being a set of hardware and software components integrated into the computing device, and wherein obtaining the object identifier data comprises reading the object identifier.

36. The computer-readable medium of claim 33, wherein the first element information further comprises a second portion of the object identifier information.

37. A computer-readable medium for storing program data, wherein the program data comprises executable instructions for implementing a method on a computing device, the method comprising:

obtaining object identifier data corresponding to an object identifier;

determining whether a command has been received to activate a first rule of a plurality of rules; and if the command has been received, activating the first rule and applying the first rule to the object identifier data.

38. The computer-readable medium of claim 37, wherein obtaining the object identifier data comprises receiving the object identifier data from an object identifier reader, and wherein the object identifier reader is a separate device connected to the computing device via a communication interface.

39. The computer-readable medium of claim 37, wherein the computing device comprises an object identifier reader, the object identifier reader being a set of hardware and software components integrated into the computing device, and wherein obtaining the object identifier data comprises reading the object identifier.

40. The computer-readable medium of claim 37, wherein the plurality of rules comprise a parent rule and a child rule, and wherein the child rule is only executed if the parent rule matches the object identifier data.

41. In a computing device, a method for processing object identifier data corresponding to an object identifier, comprising:

obtaining the object identifier data;

obtaining supplemental information about the object identifier, wherein the supplemental information identifies a symbology of the object identifier;

matching the object identifier data with a first pattern associated with a first rule that comprises first instructions;

matching the object identifier data with a second pattern associated with a second rule that comprises second instructions; and using the symbology of the object identifier to determine which of the first rule and the second rule are applied to the object identifier data.

42. The method of claim 41, wherein the computing device comprises an object identifier reader, the object identifier reader being a set of hardware and software components integrated into the computing device, and wherein obtaining the object identifier data comprises reading the object identifier.

43. The method of claim 41, wherein obtaining the object identifier data comprises receiving the object identifier data from an object identifier reader, and wherein the object identifier reader is a separate device connected to the computing device via a communication interface.

44. The method of claim 43, wherein obtaining the supplemental information comprises receiving the supplemental information from the object identifier reader.

45. The method of claim 43, wherein obtaining the supplemental information comprises:

determining the communication interface through which the object identifier data is received; and determining the supplemental information associated with the communication interface.

46. In a computing device, a method for processing object identifier data corresponding to an object identifier, comprising:

obtaining the object identifier data;

identifying information in the object identifier data;

identifying a first application to receive the information;

identifying a second application to receive the information;

sending the information to the first application in a first format; and sending the information to the second application in a second format.

47. The method of claim 46, wherein obtaining the object identifier data comprises receiving the object identifier data from an object identifier reader, and wherein the object identifier reader is a separate device connected to the computing device via a communication interface.

48. The method of claim 46, wherein the computing device comprises an object identifier reader, the object identifier reader being a set of hardware and software components integrated into the computing device, and wherein obtaining the object identifier data comprises reading the object identifier.

49. The method of claim 46, wherein the second format is the same as the first format.

50. In a computing device, a method for processing object identifier data corresponding to an object identifier, comprising:

obtaining the object identifier data;

identifying information in the object identifier data;

identifying an application to receive the information;

sending the information to the application in a first format; and sending the information to the application in a second format that is different from the first format.

51. The method of claim 50, wherein obtaining the object identifier data comprises receiving the object identifier data from an object identifier reader, and wherein the object identifier reader is a separate device connected to the computing device via a communication interface.

52. The method of claim 50, wherein the computing device comprises an object identifier reader, the object identifier reader being a set of hardware and software components integrated into the computing device, and wherein obtaining the object identifier data comprises reading the object identifier.

53. In a computing device, a method for processing object identifier data corresponding to an object identifier, comprising:
- obtaining the object identifier data;
- identifying object identifier information in the object identifier data;
- forming a first element that comprises first element information and a first characteristic, wherein the first element information comprises a first portion of the object identifier information; and
- forming a second element that comprises second element information and a second characteristic, wherein the second element information comprises the first portion of the object identifier information.

54. The method of claim 53, wherein obtaining the object identifier data comprises receiving the object identifier data from an object identifier reader, and wherein the object identifier reader is a separate device connected to the computing device via a communication interface.

55. The method of claim 53, wherein the computing device comprises an object identifier reader, the object identifier reader being a set of hardware and software components integrated into the computing device, and wherein obtaining the object identifier data comprises reading the object identifier.

56. The method of claim 53, wherein the first element information further comprises a second portion of the object identifier information.

57. In a computing device, a method for processing object identifier data corresponding to an object identifier, comprising:
- obtaining the object identifier data;
- determining whether a command has been received to activate a first rule of a plurality of rules; and
- if the command has been received, activating the first rule and applying the first rule to the object identifier data.

58. The method of claim 57, wherein obtaining the object identifier data comprises receiving the object identifier data from an object identifier reader, and wherein the object identifier reader is a separate device connected to the computing device via a communication interface.

59. The method of claim 57, wherein the computing device comprises an object identifier reader, the object identifier reader being a set of hardware and software components integrated into the computing device, and wherein obtaining the object identifier data comprises reading the object identifier.

60. The method of claim 57, wherein the plurality of rules comprise a parent rule and a child rule, and wherein the child rule is only executed if the parent rule matches the object identifier data.

* * * * *

UNITED STATES PATENT AND TRADEMARK OFFICE
CERTIFICATE OF CORRECTION

PATENT NO. : 7,070,091 B2
APPLICATION NO. : 10/773574
DATED : July 4, 2006
INVENTOR(S) : Paul Hepworth et al.

It is certified that error appears in the above-identified patent and that said Letters Patent is hereby corrected as shown below:

In Column 10, line 28, please replace "216 maybe" with --216 may be--.
In Column 10, line 41, please replace "216 maybe" with --216 may be--.
In Column 18, line 15, please replace "522 maybe" with --522 may be--.
In Column 20, line 55, please replace "keypad|" with --keypad0|--.
In Column 24, line 48, please replace "1320 maybe" with --1320 may be--.
In Column 24, line 67, please replace "Tn addition" with --In addition--.
In Column 25, line 1, please replace "1420 maybe" with --1420 may be--.

Signed and Sealed this

Ninth Day of January, 2007

JON W. DUDAS
*Director of the United States Patent and Trademark Office*